(12) United States Patent
Leonard et al.

(10) Patent No.: US 9,934,259 B2
(45) Date of Patent: Apr. 3, 2018

(54) IN-MEMORY TIME SERIES DATABASE AND PROCESSING IN A DISTRIBUTED ENVIRONMENT

(71) Applicant: SAS Institute Inc., Cary, NC (US)

(72) Inventors: Michael J. Leonard, Cary, NC (US); Ed Blair, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 841 days.

(21) Appl. No.: 14/460,673

(22) Filed: Aug. 15, 2014

(65) Prior Publication Data
US 2015/0052173 A1   Feb. 19, 2015

Related U.S. Application Data

(60) Provisional application No. 61/866,039, filed on Aug. 15, 2013.

(51) Int. Cl.
*G06F 17/30* (2006.01)

(52) U.S. Cl.
CPC .. *G06F 17/30292* (2013.01); *G06F 17/30545* (2013.01); *G06F 17/30551* (2013.01)

(58) Field of Classification Search
None
See application file for complete search history.

(56) References Cited

U.S. PATENT DOCUMENTS 5,461,699 A   10/1995   Arbabi et al.
5,615,109 A    3/1997   Eder
(Continued)

FOREIGN PATENT DOCUMENTS

| EP | 2624171 A2 | 8/2013 |
|----|------------|--------|
| WO | 2002017125 A1 | 2/2002 |
| WO | 2005/124718 A2 | 12/2005 |

OTHER PUBLICATIONS

Cecil Bozarth, Ph.D., Measuring Forecast Accuracy: Approaches to Forecasting : A Tutorial, Published Jan. 25, 2011, 3 pages.
(Continued)

*Primary Examiner* — Christopher J Raab
(74) *Attorney, Agent, or Firm* — Kilpatrick Townsend & Stockton LLP

(57) ABSTRACT

This disclosure describes methods, systems, and computer-readable media for accessing information that describes a hierarchical schema for assembling multiple time series of data in a distributed manner. The hierarchical schema associates each of the time series with a particular level of the hierarchical schema and prescribes a structure of relationships between time series assigned to different levels of the hierarchical schema. Multiple time series associated with a lowest level of the hierarchical schema are assembled by inventorying a portion of a data set. Multiple time series associated with an intermediate level of the hierarchical schema are assembled by aggregating the time series associated with the lowest level based on the structure of nested relationships. Also, multiple additional time series that are associated with the intermediate level and which were assembled by other grid-computing devices are received. After the time series are assembled, they are made available for processing to facilitate parallelized forecasting.

27 Claims, 13 Drawing Sheets

(56) References Cited

U.S. PATENT DOCUMENTS

| | | |
|---|---|---|
| 5,870,746 A | 2/1999 | Knutson et al. |
| 5,918,232 A | 6/1999 | Pouschine et al. |
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,591,255 B1 | 7/2003 | Tatum et al. |
| 6,609,085 B1 | 8/2003 | Uemura et al. |
| 6,611,726 B1 | 8/2003 | Crosswhite |
| 6,640,227 B1 | 10/2003 | Andreev |
| 6,735,738 B1 | 5/2004 | Kojima |
| 6,748,374 B1 | 6/2004 | Madan et al. |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Their et al. |
| 7,152,068 B2 | 12/2006 | Emery et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,834 B2 | 10/2008 | Joao |
| 7,523,048 B1 | 4/2009 | Dvorak |
| 7,530,025 B2 | 5/2009 | Ramarajan et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,624,114 B2 | 11/2009 | Paulus et al. |
| 7,660,734 B1 | 2/2010 | Neal et al. |
| 7,664,618 B2 | 2/2010 | Cheung et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,941,413 B2 | 5/2011 | Kashiyama et al. |
| 8,005,707 B1 | 8/2011 | Jackson et al. |
| 8,010,324 B1 | 8/2011 | Crowe et al. |
| 8,010,404 B1 | 8/2011 | Wu et al. |
| 8,014,983 B2 | 9/2011 | Crowe et al. |
| 8,015,133 B1 | 9/2011 | Wu et al. |
| 8,112,302 B1 | 2/2012 | Trovero et al. |
| 8,321,479 B2 | 11/2012 | Bley |
| 8,326,677 B1 | 12/2012 | Fan et al. |
| 8,631,040 B2 | 1/2014 | Jackson et al. |
| 9,208,209 B1 | 12/2015 | Leonard et al. |
| 2002/0169657 A1 | 11/2002 | Singh et al. |
| 2002/0169658 A1 | 11/2002 | Adler |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0030667 A1 | 2/2004 | Xu et al. |
| 2004/0041727 A1 | 3/2004 | Ishii et al. |
| 2004/0172225 A1 | 9/2004 | Hochberg et al. |
| 2004/0230470 A1 | 11/2004 | Svilar et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247900 A1 | 11/2006 | Brocklebank |
| 2007/0011175 A1 | 1/2007 | Langseth et al. |
| 2007/0055604 A1 | 3/2007 | Their et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |
| 2007/0208608 A1 | 6/2007 | Amerasinghe et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0291958 A1 | 12/2007 | Jehan |
| 2008/0040202 A1 | 2/2008 | Walser et al. |
| 2008/0208832 A1 | 8/2008 | Friedlander et al. |
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0099988 A1 | 4/2009 | Stokes et al. |
| 2009/0172035 A1 | 7/2009 | Lessing et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0114899 A1 | 5/2010 | Guha et al. |
| 2010/0121868 A1 | 5/2010 | Biannic et al. |
| 2010/0153409 A1* | 6/2010 | Joshi ............. G06F 17/30551 707/758 |
| 2010/0257133 A1 | 10/2010 | Crowe et al. |
| 2011/0106723 A1 | 5/2011 | Chipley et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2012/0123994 A1 | 5/2012 | Lowry et al. |
| 2013/0024167 A1 | 1/2013 | Blair et al. |
| 2013/0024173 A1 | 1/2013 | Brzezicki et al. |
| 2013/0103657 A1* | 4/2013 | Ikawa ............ G06F 17/30985 707/693 |
| 2014/0019088 A1 | 1/2014 | Leonard et al. |
| 2014/0019448 A1 | 1/2014 | Leonard et al. |
| 2014/0019909 A1 | 1/2014 | Leonard et al. |
| 2014/0032506 A1* | 1/2014 | Hoey ............. G06F 17/30303 707/691 |
| 2014/0046983 A1* | 2/2014 | Galloway ......... G06F 17/30958 707/798 |
| 2014/0257778 A1 | 9/2014 | Leonard et al. |
| 2016/0005055 A1 | 1/2016 | Sarferaz |
| 2016/0042101 A1 | 2/2016 | Yoshida |

(56) References Cited

U.S. PATENT DOCUMENTS

OTHER PUBLICATIONS

Davis Aquiliano Chase, Fundamentals of Operations Management, Chapter 9 Forecasting, The McGraw-Hill Companies, Inc. 2003, 42 pages.

DataNet Quality Systems, What are the Western Electric Rules, http://www.winspc.com/14-datanet-qualify-systems/support-a-re-sources/179-what-are-the-western-electric-rules, (available online Apr. 14, 2014).

First Action Interview Pilot Program Pre-Interview Communication of Jun. 12, 2015 for U.S. Appl. No. 14/668,854, 6 pages.

Aiolfi, Marco et al., "Forecast Combinations," CREATES Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/Economics Series 251, 24 pp. (May 2010).

Crowe, Keith E. et al., U.S. Appl. No. 11/431,089, filed May 9, 2006 entitled "Computer-Implemented System and Method for Generating Forecasts".

Crowe, Keith E. et al., U.S. Appl. No. 11/431,123, filed May 9, 2006 entitled "Computer-Implemented Systems and Methods for Storing Data Analysis Models".

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist-.html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa-s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jackson, Wilma S. et al., U.S. Appl. No. 11/431,127, filed May 9, 2006 entitled "Computer-Implemented Systems and Methods for Defining Events".

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael James, U.S. Appl. No. 11/696,951, filed Apr. 5, 2007 entitled "Systems and Methods for Mining Transactional and Times Series Data".

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

Park, Kwan Hee, Abstract "Development and evaluation of a prototype expert system for forecasting models", Mississippi State University, 1990, 1 pg.

Park, Youngjin et al., U.S. Appl. No. 11/431,116, filed May 9. 2006 entitled "Computer-Implemented Systems and Methods for Processing Time Series Data".

Product Brochure, Forecast PRO, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAs/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro-/dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

Using Predictor Variables, (1999) SAS OnlineDoc: Version 8, pp. 1325-1349, Accessed from: http://www.okstate.edu/sas/v8/saspdf/ets/chap27.pdf.

Van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Vanderplaats, Garret N., "Numerical Optimization Techniques for Engineering Design", Vanderplaats Research & Development (publisher), Third Edition, 18 pp. (1999).

Wang, Liang et al., "An Expert System for Forecasting Model Selection", IEEE, pp. 704-709 (1992).

(56) References Cited

OTHER PUBLICATIONS

Atuk, Oguz et al., "Seasonal Adjustment in Economic Time Series," Statistics Department, Discussion Paper No. 2002/1, Central Bank of the Republic of Turkey, Central Bank Review, 15 pp. (2002).
Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab Jun. 1, 1993 264:(6) E902-E911.
Huang, N. E. et al., "Applications of Hilbert-Huang transform to non-stationary financial time series analysis." Appl. Stochastic Models Bus. Ind., 19: 245-268 (2003).
IBM, "IBM Systems, IBM PowerExecutive Installation and User's Guide," Version 2.10, 62 pp. (Aug. 2007).
Kalpakis, K. et al., "Distance measures for effective clustering of ARIMA time-series," Data Mining, 2001. ICDM 2001, Proceedings IEEE International Conference on, vol., No., pp. 273-280, 2001.
Keogh, E. et al., "An online algorithm for segmenting time series," Data Mining, 2001. ICDM 2001, Proceedings IEEE International Conference on , vol., No., pp. 289-296, 2001.
Keogh, Eamonn et al., "Segmenting Time Series: A Survey and Novel Approach," Department of Information and Computer Science, University of California, Irvine, California 92697, 15 pp. (2004).
Palpanas, T. et al, "Online amnesic approximation of streaming time series," Data Engineering, 2004. Proceedings. 20th International Conference on , vol., No., pp. 339-349, Mar. 30-Apr. 2, 2004.
Wang Xiao-Ye; Wang Zheng-Ou; "A structure-adaptive pice-wise linear segments representation for time series," Information Reuse and Integration 2004. IR I 2004. Proceedings of the 2004 IEEE International Conference on , vol., No., pp. 433-437, Nov. 8-10, 2004.
Yu, Lean et al., "Time Series Forecasting with Multiple Candidate Models: Selecting or Combining?" Journal of System Science and Complexity, vol. 18, No. 1, pp. 1-18 (Jan. 2005).
Wang, Ming-Yeu et al., "Combined forecast process: Combining scenario analysis with the technological substitution model," Technological Forecasting and Social Change, vol. 74, pp. 357-378 (2007).
Green, Kesten C. et al., "Structured analogies for forecasting" International Journal of Forecasting, vol. 23, pp. 365-376 (2007).
Agarwal, Deepak et al., "Efficient and Effective Explanation of Change in Hierarchical Summaries", The 13$^{th}$ International Conference on Knowledge Discovery and Data Mining 2007, Aug. 12-15, 2007 (10 pages).
Hyndman, Rob J. et al., "Optimal combination forecasts for heirarchical time series", Monash University, Department of Econometrics and Business Statistics, http://www.buseco.monash.edu.au/de)Its/ebs/pubs/w)lapers/ (2007) 23 pages.
Notice of Allowance dated Oct. 5, 2015 for U.S. Appl. No. 14/668,854; 10 pages.
Notice of Allowance dated Apr. 1, 2016 for U.S. Appl. No. 14/948,970, 9 pages.

\* cited by examiner

FIG. 7

Source table 302:

| PURCHASE NUMBER | COLOR | ITEM | MONTH |
|---|---|---|---|
| 48234 | BLUE | TABLE | MAY |
| 55663 | BLUE | CHAIR | JULY |
| 234353 | BLUE | CHAIR | JUNE |
| 56456 | RED | CHAIR | AUG |
| 5645 | RED | TABLE | JULY |
| 55767 | BLUE | TABLE | JUNE |
| 765665 | RED | TABLE | AUG |
| 76765 | RED | TABLE | MAY |
| 8789 | BLUE | CHAIR | JUNE |
| 7687 | BLUE | TABLE | MAY |
| 45435 | RED | CHAIR | MAY |
| 7878 | BLUE | CHAIR | AUG |
| 56547 | BLUE | CHAIR | JULY |
| 45465 | RED | TABLE | JUNE |
| 67656 | BLUE | CHAIR | AUG |
| 344 | RED | TABLE | JULY |
| 676 | BLUE | TABLE | JULY |
| 565766 | RED | CHAIR | JUNE |
| 7868754 | BLUE | CHAIR | MAY |
| 3435443 | BLUE | TABLE | JULY |
| 2333 | RED | TABLE | MAY |
| 56576 | BLUE | TABLE | AUG |
| 7778 | RED | TABLE | JUNE |
| 2435 | BLUE | TABLE | AUG |
| 787989 | RED | CHAIR | MAY |
| 23432432 | BLUE | CHAIR | JUNE |
| 3454 | RED | CHAIR | JUNE |
| 23433 | RED | TABLE | AUG |
| 5767 | BLUE | TABLE | JUNE |
| 765676 | RED | CHAIR | JUNE |
| 787 | BLUE | TABLE | AUG |
| 34543 | BLUE | CHAIR | AUG |
| 23423 | RED | TABLE | MAY |
| 4354356 | BLUE | CHAIR | JULY |
| 68787 | RED | CHAIR | JULY |
| 3454 | BLUE | TABLE | AUG |
| 4354 | RED | TABLE | MAY |

PARTITIONING ON COLOR VARIABLE ONLY

PARTITION ASSIGNED TO FIRST GRID-COMPUTING DEVICE (402):

| 48234 | BLUE | TABLE | MAY |
|---|---|---|---|
| 55663 | BLUE | CHAIR | JULY |
| 234353 | BLUE | CHAIR | JUNE |
| 55767 | BLUE | TABLE | JUNE |
| 8789 | BLUE | CHAIR | JUNE |
| 7687 | BLUE | TABLE | MAY |
| 7878 | BLUE | CHAIR | AUG |
| 56547 | BLUE | CHAIR | JULY |
| 67656 | BLUE | CHAIR | AUG |
| 676 | BLUE | TABLE | JULY |
| 7868754 | BLUE | CHAIR | MAY |
| 3435443 | BLUE | TABLE | JULY |
| 56576 | BLUE | TABLE | AUG |
| 2435 | BLUE | TABLE | AUG |
| 23432432 | BLUE | CHAIR | JUNE |
| 5767 | BLUE | TABLE | JUNE |
| 787 | BLUE | TABLE | AUG |
| 34543 | BLUE | CHAIR | AUG |
| 4354356 | BLUE | CHAIR | JULY |
| 3454 | BLUE | TABLE | JUNE |

PARTITION ASSIGNED TO SECOND GRID-COMPUTING DEVICE (404):

| 56456 | RED | CHAIR | AUG |
|---|---|---|---|
| 5645 | RED | TABLE | JULY |
| 765665 | RED | TABLE | AUG |
| 76765 | RED | TABLE | MAY |
| 45435 | RED | CHAIR | MAY |
| 45465 | RED | TABLE | JUNE |
| 344 | RED | TABLE | JULY |
| 565766 | RED | CHAIR | JUNE |
| 2333 | RED | TABLE | MAY |
| 7778 | RED | TABLE | JUNE |
| 787989 | RED | CHAIR | MAY |
| 3454 | RED | CHAIR | JUNE |
| 23433 | RED | TABLE | AUG |
| 765676 | RED | CHAIR | JUNE |
| 23423 | RED | TABLE | MAY |
| 68787 | RED | CHAIR | JULY |
| 4354 | RED | TABLE | MAY |

FIG. 8

302 (main table)

| PURCHASE NUMBER | COLOR | ITEM | MONTH |
|---|---|---|---|
| 48234 | BLUE | TABLE | MAY |
| 55663 | BLUE | CHAIR | JULY |
| 234353 | BLUE | CHAIR | JUNE |
| 56456 | RED | CHAIR | AUG |
| 5645 | RED | TABLE | JULY |
| 55767 | BLUE | TABLE | JUNE |
| 765665 | RED | TABLE | AUG |
| 76765 | RED | TABLE | MAY |
| 8789 | BLUE | CHAIR | JUNE |
| 7687 | BLUE | CHAIR | MAY |
| 45435 | RED | CHAIR | AUG |
| 78878 | BLUE | CHAIR | JULY |
| 56547 | BLUE | CHAIR | JUNE |
| 45465 | RED | TABLE | JUNE |
| 67656 | BLUE | CHAIR | AUG |
| 344 | RED | TABLE | JUNE |
| 676 | BLUE | TABLE | JULY |
| 565766 | RED | CHAIR | JUNE |
| 7868754 | BLUE | CHAIR | MAY |
| 3435443 | BLUE | TABLE | JULY |
| 2333 | RED | TABLE | MAY |
| 56576 | BLUE | TABLE | AUG |
| 7778 | RED | TABLE | JUNE |
| 2435 | BLUE | TABLE | AUG |
| 787989 | RED | CHAIR | MAY |
| 23432432 | BLUE | CHAIR | AUG |
| 3454 | RED | TABLE | JUNE |
| 23433 | BLUE | TABLE | AUG |
| 5767 | BLUE | TABLE | JULY |
| 765676 | RED | TABLE | JUNE |
| 787 | BLUE | CHAIR | AUG |
| 34543 | BLUE | CHAIR | JULY |
| 23423 | RED | TABLE | JULY |
| 4354356 | BLUE | CHAIR | JULY |
| 68787 | RED | TABLE | JUNE |
| 3454 | BLUE | TABLE | JUNE |
| 4354 | RED | TABLE | MAY |

PARTITIONING ON COLOR/ITEM VARIABLE COMBINATION

502 — PARTITION ASSIGNED TO FIRST GRID-COMPUTING DEVICE

| 48234 | BLUE | TABLE | MAY |
|---|---|---|---|
| 3454 | BLUE | TABLE | JUNE |
| 55767 | BLUE | TABLE | JUNE |
| 676 | BLUE | TABLE | JULY |
| 5767 | BLUE | TABLE | JUNE |
| 3435443 | BLUE | TABLE | JULY |
| 56576 | BLUE | TABLE | AUG |
| 2435 | BLUE | TABLE | AUG |
| 565766 | RED | CHAIR | JUNE |
| 45435 | RED | CHAIR | MAY |
| 56456 | RED | CHAIR | AUG |
| 787989 | RED | CHAIR | MAY |
| 3454 | RED | CHAIR | JUNE |

504 — PARTITION ASSIGNED TO SECOND GRID-COMPUTING DEVICE

| 5645 | RED | TABLE | JULY |
|---|---|---|---|
| 765665 | RED | TABLE | AUG |
| 76765 | RED | TABLE | MAY |
| 45465 | RED | TABLE | JUNE |
| 344 | RED | TABLE | JUNE |
| 2333 | RED | TABLE | MAY |
| 7778 | RED | TABLE | JUNE |
| 23433 | RED | TABLE | JUNE |
| 765676 | RED | TABLE | JULY |
| 23423 | RED | TABLE | AUG |
| 68787 | RED | TABLE | JUNE |
| 4354 | RED | TABLE | MAY |
| 55663 | BLUE | CHAIR | JULY |
| 234353 | BLUE | CHAIR | JUNE |
| 23432432 | BLUE | CHAIR | AUG |
| 7868754 | BLUE | CHAIR | MAY |
| 787 | BLUE | CHAIR | AUG |
| 34543 | BLUE | CHAIR | JULY |
| 4354356 | BLUE | CHAIR | JULY |
| 8789 | BLUE | CHAIR | JUNE |
| 7687 | BLUE | CHAIR | MAY |
| 7878 | BLUE | CHAIR | JUNE |
| 56547 | BLUE | CHAIR | AUG |
| 67656 | BLUE | CHAIR | AUG |

PARTITIONING ON COLOR/ITEM VARIABLE COMBINATION

IN-MEMORY TIME SERIES DATABASE AND PROCESSING IN A DISTRIBUTED ENVIRONMENT

CROSS-REFERENCE TO RELATED APPLICATIONS

This is a non-provisional of and claims the benefit and priority under 35 U.S.C. § 119(e) of U.S. Provisional App. No. 61/866,039, titled "In-Memory Time Series Database and Processing in a Distributed Environment". That U.S. Provisional Application was filed on Aug. 15, 2013, and is incorporated by reference herein for all purposes.

TECHNICAL FIELD

Aspects of this disclosure generally relate to the efficient assembly, storage and use of time-series data in computerized forecasting systems.

BACKGROUND

Some of the forecasting tools and analytics most commonly used in business intelligence involve time series forecasting. When time series forecasting is performed, users frequently wish to evaluate and compare numerous forecasts derived from large compilations of historical data.

BRIEF SUMMARY

This disclosure describes a computer-program product that includes instructions operable to cause a grid-computing device to access information while being operated in a grid-computing system that includes other grid-computing devices, wherein the information describes a hierarchical schema for assembling multiple time series of data in a distributed manner that includes assembling multiple time series at the grid-computing device and other time series at the other grid-computing devices, wherein the hierarchical schema associates each of the multiple time series with a particular level of the hierarchical schema and prescribes a structure of relationships between time series assigned to different levels of the hierarchical schema. The instructions are also operable to cause the grid-computing device to assemble multiple time series associated with a lowest level of the hierarchical schema by inventorying a portion of a data set, assemble multiple time series associated with an intermediate level of the hierarchical schema by aggregating the time series associated with the lowest level based on the structure of nested relationships, wherein the intermediate level is above the lowest level, receive multiple additional time series associated with the intermediate level and assembled by at least one of the other grid-computing devices, assemble a time series associated with a level of the hierarchical schema above the intermediate level by aggregating the assembled time series associated with the intermediate level and the multiple additional time series based on the structure of nested relationships, use volatile memory to store the time series associated with the level above the intermediate level, access the stored time series in memory, and generate a forecast by processing the accessed time series.

This disclosure also describes a method that includes accessing information describing a hierarchical schema for assembling multiple time series of data in a distributed manner that includes assembling multiple time series at the grid-computing device and other time series at the other grid-computing devices, wherein the hierarchical schema associates individual time series with a particular level of the hierarchical schema and prescribes a structure of relationships between time series assigned to different levels of the hierarchical schema, assembling multiple time series associated with a lowest level of the hierarchical schema by inventorying a portion of a data set, assembling multiple time series associated with an intermediate level of the hierarchical schema by aggregating the time series associated with the lowest level based on the structure of relationships, wherein the intermediate level is above the lowest level, receiving multiple additional time series associated with the intermediate level and assembled by at least one of the other grid-computing devices, assembling a time series associated with a level of the hierarchical schema above the intermediate level by aggregating the assembled time series associated with the intermediate level and the multiple additional time series based on the structure of nested relationships, using volatile memory to store the time series associated with the level above the intermediate level, accessing the stored time series in memory, and generating a forecast by processing the accessed time series.

DETAILED DESCRIPTION OF THE DRAWINGS

Aspects of the disclosure are illustrated by way of example. In the accompanying figures, like reference numbers indicate similar elements, and:

FIG. 1 is a block diagram with an example of a computing device configured to perform operations and use techniques described in this disclosure.

FIG. 2 is a block diagram with an example of a grid-computing system configured to perform operations and use techniques described in this disclosure.

FIG. 3 depicts an example of a time series hierarchy as described in this disclosure.

FIG. 4 shows an example of operations that may be used to assemble time series from unstructured data.

FIG. 5 shows an example of additional operations that may be used, subsequent to the operations of FIG. 4, to assemble time series from unstructured data.

FIG. 6 depicts an example of a series of operations that a computing device may use to assemble a time series hierarchy prescribed by a hierarchical schema.

FIG. 7 shows one example of group-by partitioning of a data set.

FIG. 8 shows an alternative example of group-by partitioning of a data set.

FIG. 9 is an example of a partitioning schema and a hierarchical schema that are suitable to be used together in a grid-computing system.

FIG. 10 depicts an example of partitioning schema and a hierarchical schema.

FIG. 11 depicts one example of grid-computing system operations that facilitate assembly of a time series data hierarchy.

FIG. 12 is a flowchart that shows an example of grid-computing system operations that facilitate assembly of a time series data hierarchy.

FIG. 13 is a flowchart that shows an example of operations described in this disclosure.

BRIEF DESCRIPTION OF THE DRAWINGS

Analyzing and comparing many forecasts from a variety of forecasting models and in a variety of data contexts may provide valuable insights regarding the nature of the data and the forecasting problem being addressed, advantageous ways of training and applying available forecasting models, as well as interpretation and synthesis of the forecasts that the models produce. For this reason, when a sample of related data observations serves as a basis of forecasting decisions intended to address an overarching forecasting dilemma, forecasters often desire to quickly analyze several forecasts by assembling, presenting, accessing and processing time series data in several different ways.

This disclosure describes a grid-computing system for time series data warehousing, forecasting and forecast analysis that includes multiple grid-computing devices. The grid-computing devices within the grid-computing system can process a hierarchical schema that serves as a framework for efficiently assembling multiple time series through parallel computing and information sharing. The grid-computing system can provide a distributed data storage architecture involving memory locations, such as volatile memory locations like multiple random access memory (RAM) locations for example, at which the various assembled time series are stored throughout the grid-computing system.

Following the assembly and in-memory storage of the various time series, any grid-computing device in the grid-computing system may be used to forecast future observations of any individual time series that it stores. As a result of the distributed storage framework and because the time series data are stored in volatile memory locations, such as RAM, the data can be quickly accessed and processed, thereby decreasing time delays entailed by generating numerous forecasts. Additionally, the distributed storage of the time series data facilitates using parallelized computing to generate multiple distinct time series forecasts at one time.

The hierarchical schema may specify multiple time series and a distributed, tree-structured storage architecture for storing the time series at volatile memory locations, such as RAM locations for example, throughout the grid-computing system. As the storage architecture is tree-structured, the schema specifies parent-child relationships between related time series at adjacent hierarchy levels. Thus, the schema itself may be conceptualized as a tree-structured framework that establishes processing assignments, data relationships and storage locations. The grid-computing devices use the schema as a guide for assembling time series and sharing time series information with other grid-computing devices in the grid-computing system.

The hierarchical schema may prescribe multiple time series associated with a lowest level of the hierarchy—e.g. a "leaf" level. In general, these time series are associated with the leaf-level of the hierarchy because they contain data that is more specific or focused than other time series prescribed by the hierarchy. At higher levels of the hierarchy, the time series data is more general than the time series at lower levels. For example, in a hypothetical hierarchical schema, each leaf-level time series could provide election voting data gathered in a particular city found within a given country, while time series at a higher level could provide election voting data gathered throughout the country.

Figure 1:
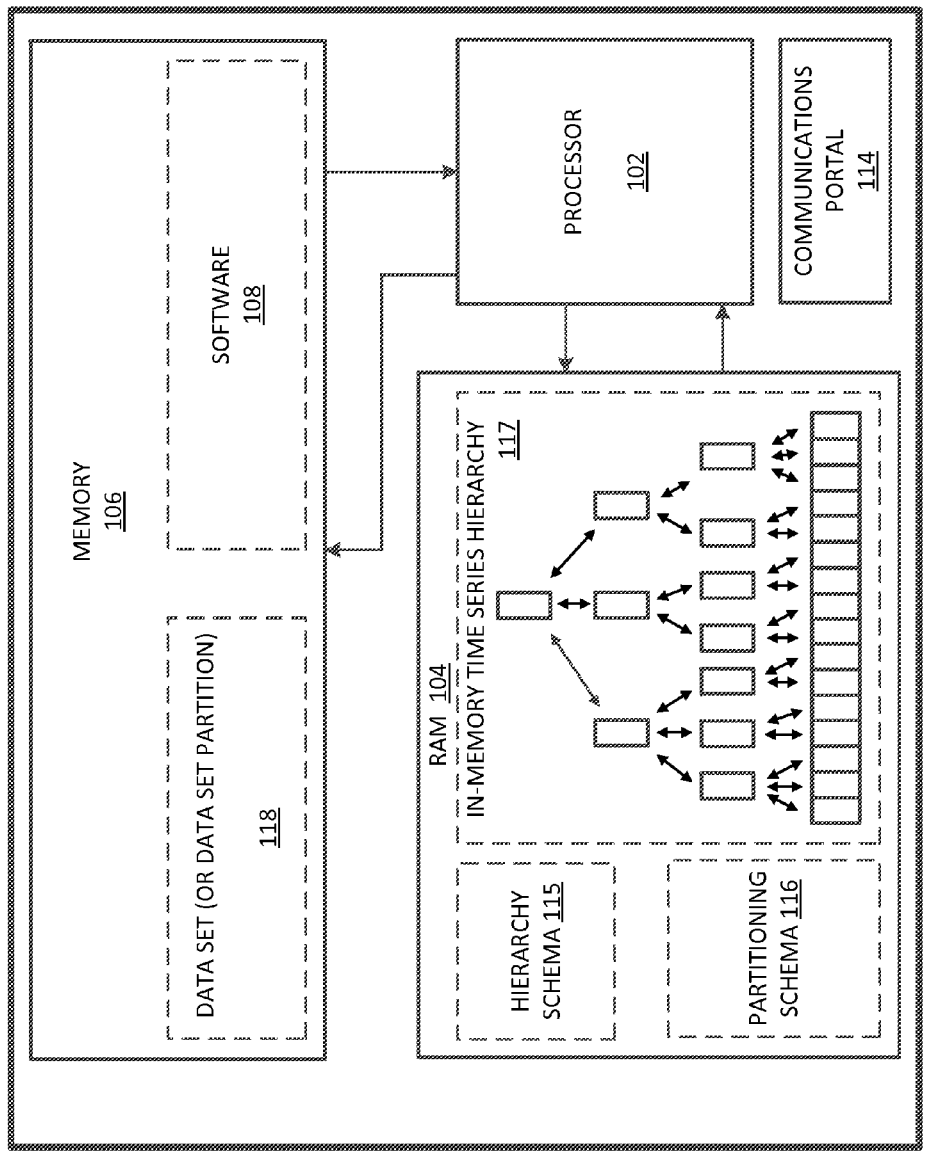

FIG. 1 illustrates a computing device 100 configured to use the techniques described in this disclosure to efficiently assemble and store time series in a manner prescribed by a hierarchical schema. The computing device 100 is configured to operate within a grid-computing system that includes multiple computing devices configured similarly or identically to the computing device 100 shown in FIG. 1. It should be understood that several of the techniques, methodologies and technical improvements explained herein are relevant in both a grid-computing context in which multiple computing devices perform computing operations collectively, and in a standalone computing context that involves computing operations performed by a single machine.

For explanatory purposes, this disclosure will reference computing operations performed in both such contexts. For this reason, when this disclosure refers to a computing device in the standalone context or in a more general sense in which a particular context is not intended to be implied, the computing device will be referred to as "computing device 100". When this disclosure refers to computing operations in the grid computing context, or when a particular point specifically relevant to the grid-computing context is intended, the computing device will be referred to as "computing device 100G" or "grid-computing device 100G".

As depicted in FIG. 1, a computing device 100 includes a processor 102, random access memory 104, and memory 106. Memory 106 may be used to store software 108 executed by the processor 102. Memory 106 may also be used to store an unstructured data set or data partition 118 of a larger data set that has been divided into multiple partitions to facilitate distributed storage by multiple computing devices 100G, each of which stores one of the partitions.

The software 108 can be analytical, statistical, scientific, or business analysis software, or any other software with functionality for assembling time series from unstructured data entries and storing the time series in RAM 104 as prescribed by a hierarchical schema. The software 108 may also provide functionality for performing repeated time series forecasting based on any of the time series stored in RAM 104. When executed, the software 108 causes the processor 102 to access a hierarchy schema 115.

In the grid-computing context, the software 108 may also cause the processor 102 to access a partitioning schema 116. The processor 102 uses the partitioning schema 116 to identify a data partition 118 (subset) of a larger data set for reasons that will be explained later.

The hierarchy schema 115 prescribes various time series to be assembled based on the information in the data set or partition 118 of the data set. These time series are associated with the lowest level (leaf level) of the time series hierarchy 117 that the schema 115 specifies. The hierarchy schema 115 may also prescribe additional time series above the leaf level of the hierarchy 117, and may specify that any of these time series be assembled by aggregating or synthesizing the data observations provided by specified time series at the leaf level.

The software 108 provides instructions used by the computing device 100 to assemble time series prescribed by the hierarchy schema 115 and to store the time series in random access memory (RAM) 104. FIG. 1 displays multiple time series as small rectangles (not referenced by a number) that are stored in a hierarchical storage structure (also referred to as a "time series hierarchy") 117 in RAM 104.

The software 108 may instruct the computing device 100 to generate and format a time series hierarchy 117 or a portion of a time series hierarchy 117 by using any of a wide variety of data storage structures, to include arrays, lists, indexed sets, queues, heaps or the like. For example, the computing device 100 can store any number of time series in a two-dimensional array that stores representations of time intervals in one column, and time series data observations in another other column. In such a case, any individual time series observation can be indexed to a corresponding time interval by being placed in the same row as the time interval representation. Data storage structures used to store time series can also be used to store any number of pointers or other information used to indicate a position of a time series in the hierarchy, or a relationship with other time series.

The software 108 may also include features that facilitate flexibility with regard to the time intervals used within the time series of a time series hierarchy 117. For example, the software may include instructions that enable a time interval to be selected based on the characteristics of data represented by the time series of the hierarchy 117. An explanation of software and system operations that facilitate flexibility with regard to time intervals can be found in U.S. Pat. No. 8,631,040, which is entitled "Computer-Implemented Systems and Methods for Flexible Definition of Time Intervals" and is included by reference in its entirety for all purposes.

A data set or unstructured data set partition 118 can include any type of time-stamped data suitable for serving as the basis of multiple time series that can logically be organized within a hierarchy. The unstructured data may include, for example, scientific or business data—whether gathered manually, automatically from sensors, or generated by commercial, Internet, mechanical or communications activity.

Figure 2:
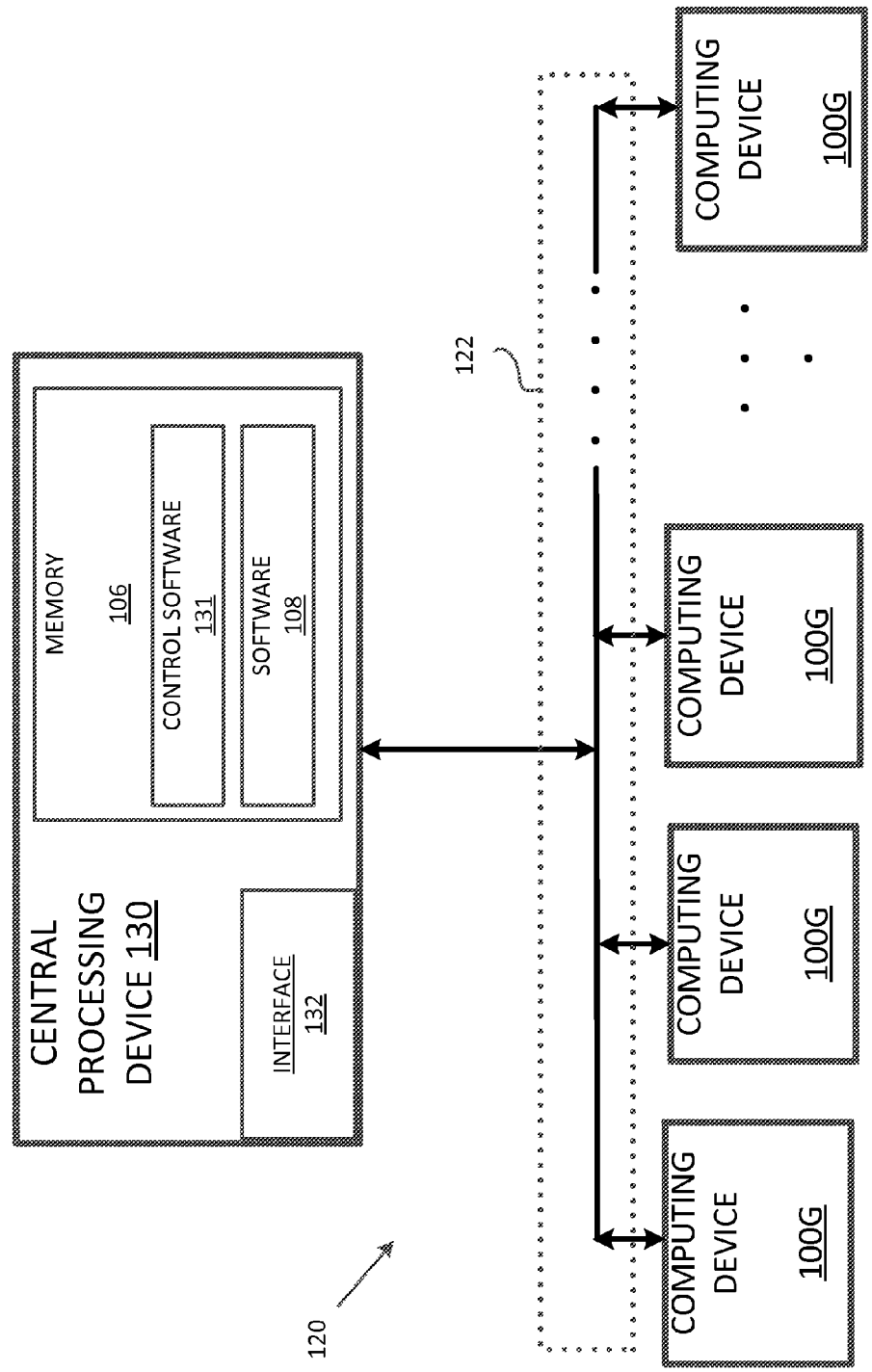

FIG. 2 illustrates a grid-computing system in which multiple grid-computing devices 100G collectively perform processing operations and share computed information in order to construct and store a time series hierarchy, and perform forecasting based on the time series of the hierarchy.

As depicted in FIG. 2, the grid-computing system includes multiple grid-computing devices 100G. Each grid-computing device may be capable of communicating with one or more of the other grid-computing devices through use of a data bus 122 or other type of communication channel. The computing devices 100G may include the same components, to include software or hardware components, described previously with regard to the computing device 100 in FIG. 1. Computing devices 100G may be characterized by any number of other alternative configurations that facilitate the techniques, operations and technical improvements described herein.

As shown in FIG. 2, the grid-computing devices 100G may be partially controlled or synchronized by a central processing device 130. The central processing device (also referred to as a central controller) may include an interface 132 for obtaining a data set so that the grid-computing devices 100G can assemble a time series hierarchy.

The central processing device 130 includes a memory 106 that can be used to store control software 131, as well as the software 108 previously mentioned with regard to FIG. 1. The central processing device 130 may also be connected to data bus 122 or any other channel or network used for communication between devices in the grid-computing system 120. The central processing device 130 may use the data bus 122 to provide the data set to each of the grid-computing devices 100G. When the data set is provided to each of the grid-computing devices 100G, each grid-computing device may use the partitioning schema to delimit a particular portion of the data set (i.e., a partition). Each grid-computing device 100G then uses the hierarchical schema to guide operations that involve assembling a subset of the leaf-level time series specified by the schema, with the assembling being based on the information in its delimited portion of the data set. In this parallelized process, the assembly of the entire leaf-level of the time series hierarchy is the collective result of the separate and unique leaf-level time series assembled by individual grid-computing devices.

Alternatively, the central processing device 130 may partition a data set such that one partition is defined per grid-computing device 100G in the grid-computing system 120. In this case, the central processing device 130 then uses the data bus 122 to send the partitions to the grid-computing devices 100G in such a way that each grid-computing device receives a single partition. Each grid-computing device 100G then stores its partition in memory 106, and later uses the partition in assembling the leaf-level time series that the grid-computing device 100G contributes to the collective assembly of the time series hierarchy 117.

Figure 3:
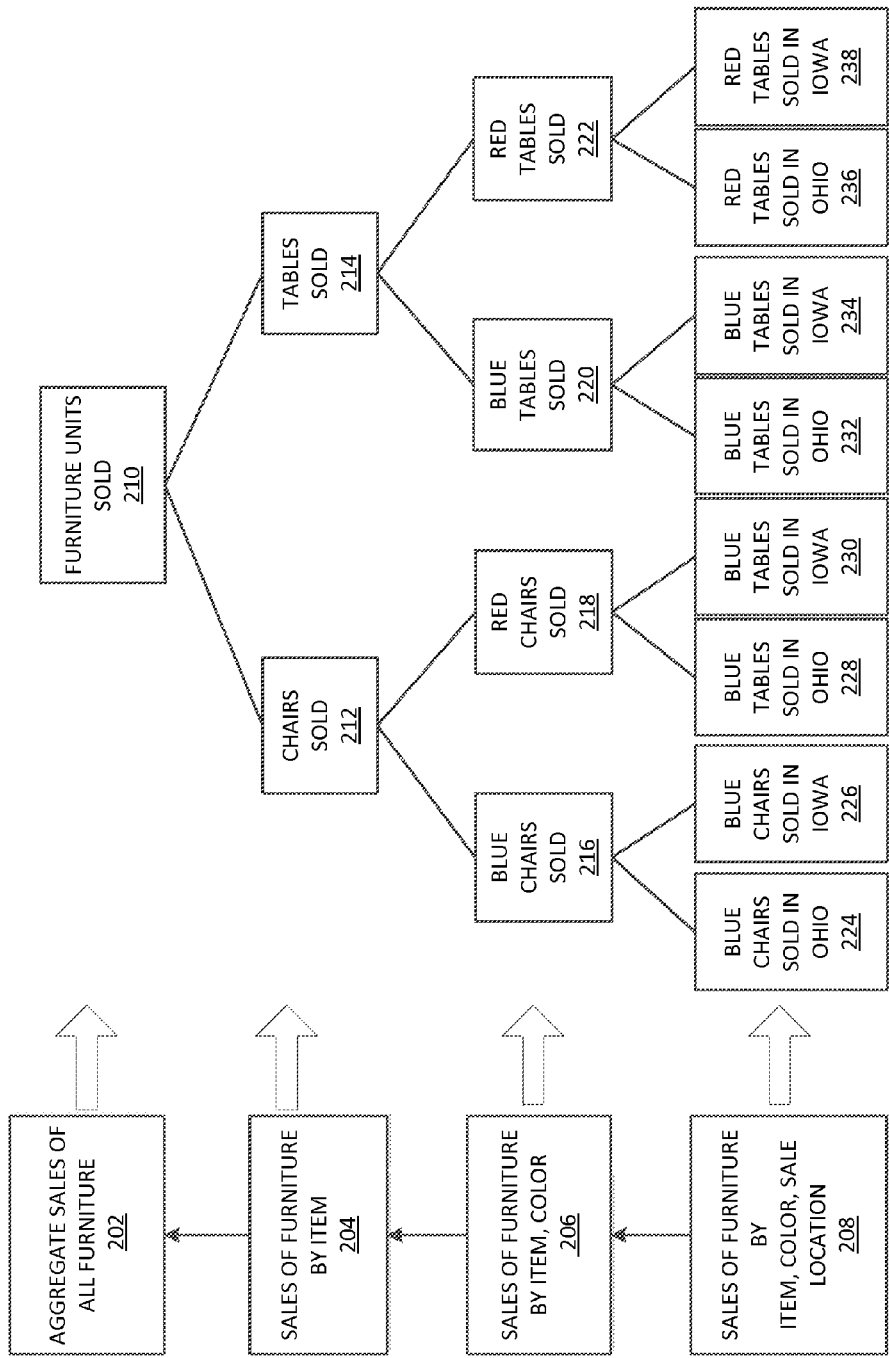

FIG. 3 helps to explain several of the concepts mentioned above in the description of the use of a hierarchical schema. FIG. 3 illustrates certain details related to the use of an exemplary hierarchical schema in assembling a time series data hierarchy for storing sales data of a hypothetical business. For purposes of explanation, the business will be assumed to record daily sales of red and blue dining furniture at stores in Ohio and Iowa.

As compared to other hierarchical schemas generated for use in a grid-computing system, the schema of FIG. 3 is simplified in that the schema specifies that an entire time series data hierarchy be assembled and stored at a single computing device 100. Later, this disclosure will explain how a hierarchical schema can be the blueprint for assembling, storing and using a time series data hierarchy in a distributed computing system that incorporates load-sharing to parallelize some of the processing involved in generating a time series data hierarchy. Nonetheless, the simplified time series data hierarchy shown in FIG. 3 is illustrative of several concepts that are relevant in both standalone and the grid-computing context.

In FIG. 3, the depicted schema defines four hierarchical levels, each of which is associated with the storage of time series characterized by a level of granularity or specificity particular to the level. The four levels of the hierarchy are represented by the boxes 202, 204, 206 and 208. The schema calls for eight time series (224-238) at the lowest level (leaf level) of the hierarchy to be assembled such that each of these time series will provide information that is more specific than all other time series in the hierarchy. The lowest level of the hierarchy is represented by the box at 208, which describes the context of the time series 224-238 associated with that level.

The schema prescribes that each of the lowest level time series (224-238) is dedicated to documenting sales of a single type (table or chair) and color (blue, red) combination of furniture occurring in a particular state (Ohio or Iowa).

The schema also prescribes that four time series (216, 218, 220 and 222) be associated with the second level of the hierarchy, and that these time series provide information that is less specific than the time series (224-238) at the lowest level of the hierarchy. As shown at 206, the schema defines each of these time series (216-222) to be dedicated to documenting overall sales (inclusive of both Ohio and Iowa) of a specific type (table or chair) and color (blue, red) furniture combination. As a result of this organization, time series 216 represents an upwards accumulation of time series 224 and time series 226. Similarly, time series 218 represents an upwards accumulation of time series 228 and 230, and so on, as indicated by the lines that connect time series at different levels. Moreover, the same concepts apply to time series 212 and 214 at the third level of the hierarchy, and time series 210 at the top level of the hierarchy.

Figure 4:
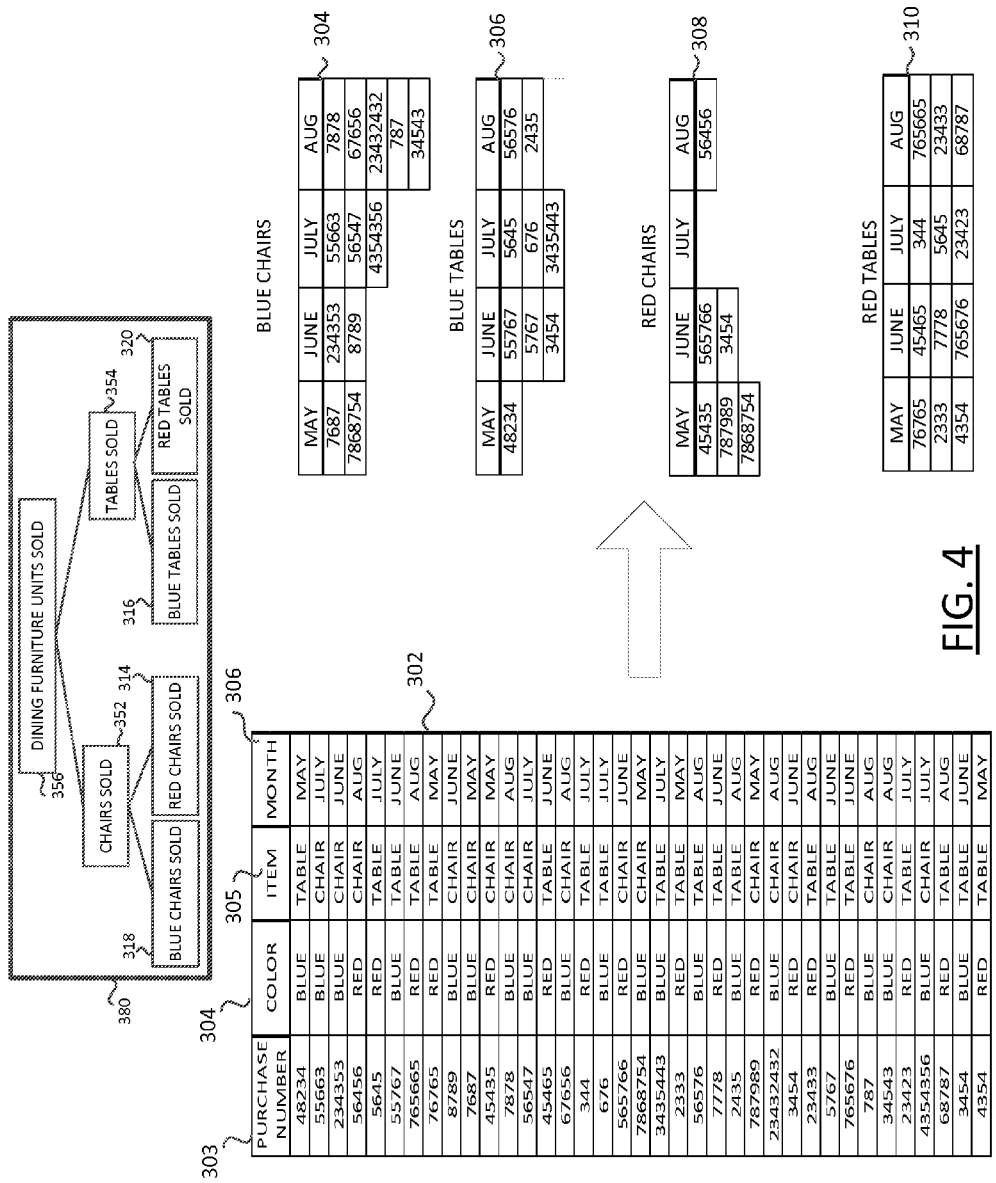
Figure 5:
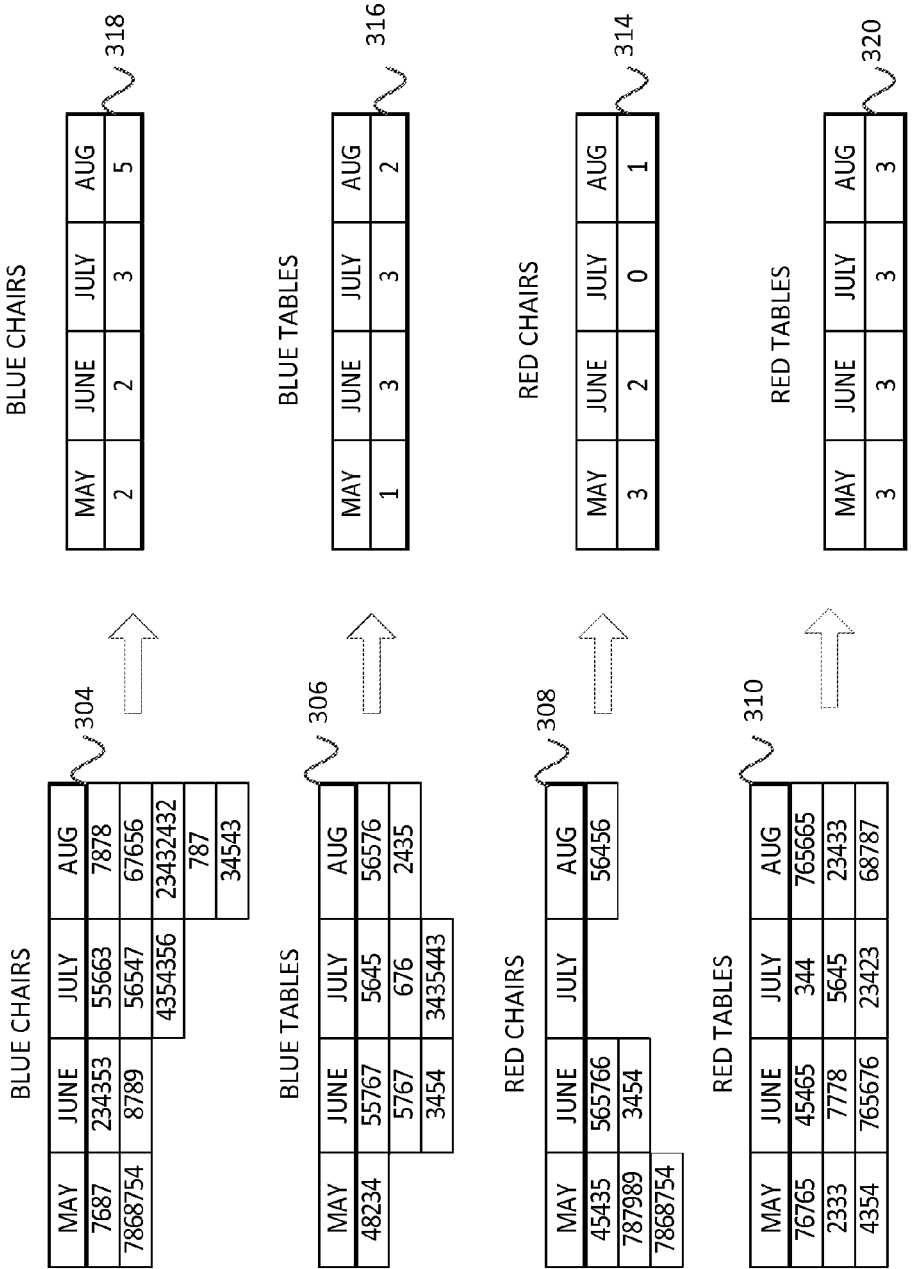

FIG. 4 and FIG. 5 are generalized illustrations of a process of assembling multiple leaf-level time series prescribed by a hierarchical schema. In FIGS. 4 and 5, the schema is depicted at 380. The schema 380 prescribes that a computing device assemble four leaf-level time series 314, 316, 318 and 320 based on the data entries found in data set 302. In FIG. 4, the data set 302 is depicted as a row/column table.

Although FIG. 4 and FIG. 5 are directed to the operations of a single computing device 100 in a standalone computing context, these drawings are illustrative of generally applicable techniques for processing data in an unstructured data set to assemble leaf-level time series. Thus, a grid-computing device 100G may use these same techniques to assemble leaf level-time series based on the data in a data set partition.

As described previously, the systems described herein can be used to assemble time series data hierarchies from unstructured data sets. Such unstructured data sets may include data entries that document different types of events, and which, within the set, are not ordered in any particular way. These unstructured data sets may exist as a row column table, such as data set 302.

Data set 302 includes multi-dimensional entries arranged in a row/column format such that each entry occupies a row, and each variable dimension is associated with a column. Within a data set, any number of individual entries may provide data that relates to a single event—such as an action, outcome, sale, item, time period, or the like. Additionally or alternatively, individual entries may provide data that relates to a grouping or collection of such events. Within each individual entry, multiple dimensions of data may be used to provide information about a represented event or grouping of events.

For example, in a data set such as data set 302, the rows might be understood as data entries that represent a business's sales of individual furniture items. In this context, each row could be used to represent a particular sale of a single item. In the aggregate, the data set could hypothetically represent such furniture sales results for all furniture sold by the business during a time period of interest, or alternatively, all of the business's sales of specific types of furniture during the time period.

For purposes of explanation, assume that in this hypothetical arrangement, the "color" 304 and "item" 305 data found in each row provides details about a furniture item sold. Within each entry (i.e., row), the "purchase number" 303 data identifies the specific unit sold, and the "month" 306 data is a time-stamp indicating when the furniture item was sold. For purposes of simplified explanation only, data set 302 will be understood to provide such representations throughout this disclosure.

Each entry in data set 302 documents a sale of a furniture item falling within one of four represented furniture categories. These four categories of furniture are blue chairs, blue tables, red chairs, and red tables. Each entry further includes information about a month during which the documented sale occurred, as well as color and item information that can be used to determine the category of furniture corresponding to that entry.

The hierarchical schema 380 prescribes that four leaf-level time series be assembled to provide information about monthly sales of the various types of furniture represented within data set 302. These leaf-level time series include a monthly time series 318 to represent monthly sales of blue chairs, a time series 314 to represent monthly sales of red chairs, a time series 316 to represent monthly sales of blue tables 316, and a time series 320 to represent monthly sales of red tables.

FIG. 4 depicts that the entries of data set 302 are binned by month of sale in order to assemble the leaf-level time series 314, 316, 318, 320 prescribed by the hierarchical schema 380. In the binning process, separate monthly bins are maintained with respect to each of the furniture categories. This binning arrangement is shown at 304, 306, 308 and 310. Thus, each entry is binned based on the furniture category that it corresponds to, and the month of the sale that the entry represents. The binning of entries that represent red table sales is shown at 310. Similarly, the binning of entries that represent blue table, blue chair, and red chair sales is shown at 306, 304 and 308, respectively.

When the binning is complete, the results can be used to generate a time series with respect to each of the furniture categories. The conversion of binned entries to time series data is shown in FIG. 5.

In FIG. 5, the results of binning entries that represent sales of blue chairs are shown at 304. Similarly, the results with respect to blue table sales, red chair sales and red table sales are shown at 306, 308 and 310, respectively.

The actual leaf-level time series prescribed by the hierarchical schema 380 are also shown at 314, 316, 318 and 320. Time series 314 provides monthly sales of blue chairs, and the time series 314 is formed by determining the number of sales entries associated with each of the bins that are shown at 304 with respect to months May, June, July and August. Similarly, time series 316, 318 and 320 are formed by determining the number of sales entries associated with each of the monthly bins that are shown at 306, 308 and 310, respectively. By being generated in this way, time series 314, 316, 318 and 320 provide monthly counts of sales entries within their respective furniture categories.

Figure 6:
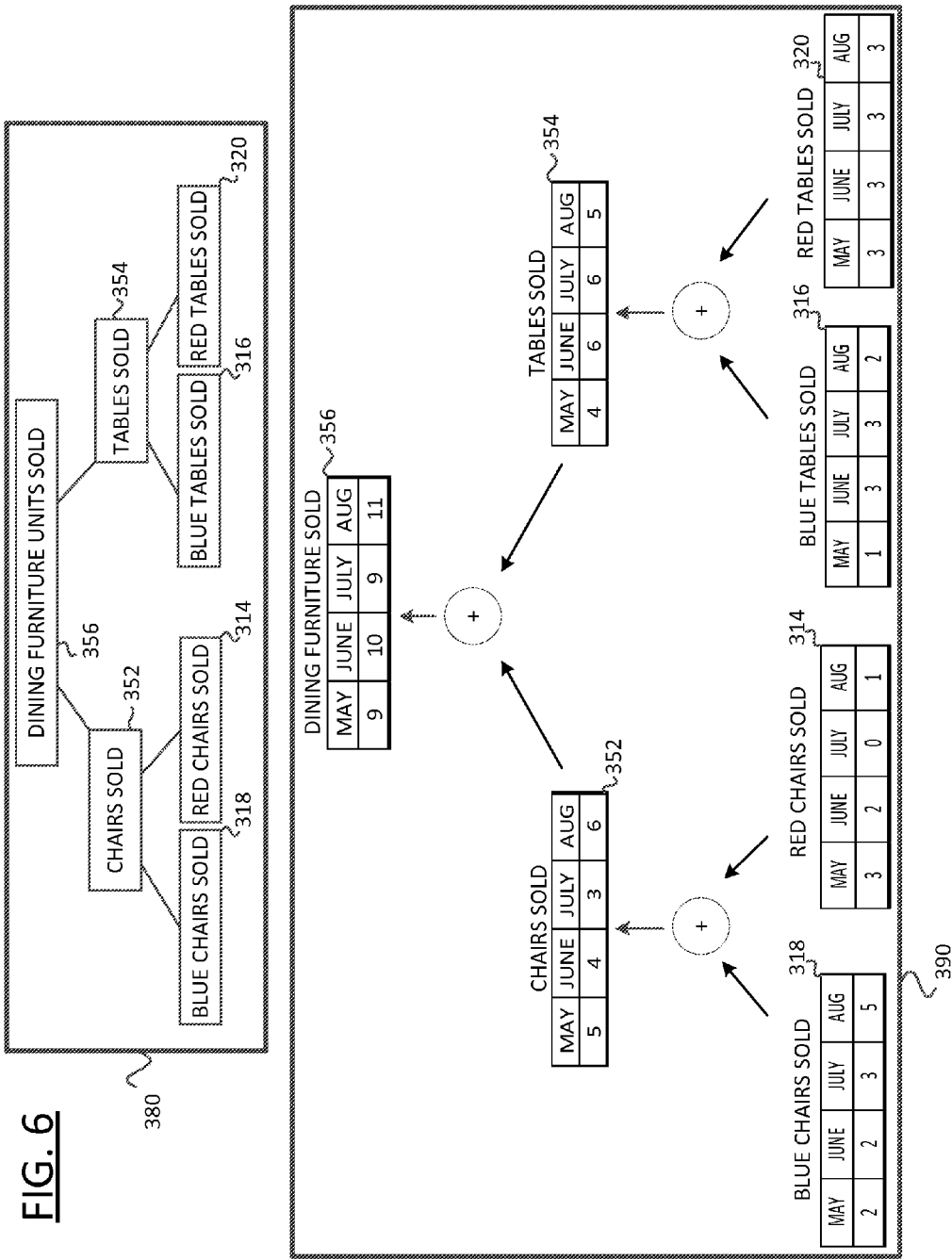

FIG. 6 illustrates additional time series assembly operations during an example process of creating a time series hierarchy. While FIG. 4 and FIG. 5 depict leaf-level time series 314, 316, 318, 320 being assembled as prescribed by schema 380, FIG. 6 depicts time series 352 and 354 being assembled at a second level of the hierarchy as prescribed by schema 380. FIG. 6 also depicts time series 356 being assembled at the top level of the hierarchy.

As depicted in FIG. 6, the hierarchical schema 380 prescribes two time series 352, 354 at the second level of the time series hierarchy. The schema 380 defines time series 352 as representing monthly sales of chairs without regard to color. As depicted by the lines connecting time series 352 with time series 318 and 314, the schema 380 indicates that the time series data values within time series 352 be obtained through the accumulation of time series 318 and 314. Accordingly, as part of the time series assembly process depicted at 390, time series 352 is shown as being assembled by way of aggregation of time series 318 and 314. The aggregation process involves month-by-month addition of the time series data values found within time series 314 and 318.

Similarly, the hierarchical schema 380 prescribes that the time series data values within time series 354 be obtained through the accumulation of time series 316 and 320. Accordingly, as part of the time series assembly process depicted at 390, time series 354 is shown as being assembled by way of aggregation of time series 316 and 320. The aggregation process involves month-by-month addition of the time series data values found within time series 316 and 320.

The schema 380 prescribes that at the third level (top level) of the hierarchy, the time series 356 represents monthly sales of all furniture, without regard to type or color. The schema 380 also prescribes that this time series 356 be assembled by aggregating time series 352 and 354, once these two time series are assembled. The depiction at 390 further shows how such an aggregation could be performed through month-by-month addition.

Although FIG. 6 depicts aggregation as involving month-by-month addition of those leaf-level time series linked to a same second-level time series by schema 380, aggregation need not involve period-by-period addition. Other mathematical or analytical operations can be used as well. For example, hierarchical schema 380 could be modified to prescribe that time series 352 provide an average by color, computed on a monthly basis, of the chair sales represented by time series 318 and 314. In this case, aggregation would involve a month-by-month averaging operation that averages the time series data values found within time series 318 and time series 314.

To help to enable parallelization to accelerate the process of assembling a time series data hierarchy in the grid-computing context, the data can be prepared by being partitioned such that each grid-computing device stores and then works on an exclusive portion of the data that need not be stored or processed by any other device in the system. The resulting partitions may then be distributed amongst the grid-computing devices such that each grid-computing device is provided with one of the partitions, for example.

Each grid-computing device then processes the time stamped entries in its partition, and assembles the time series as prescribed by the hierarchical schema.

The various grid-computing devices may assemble these time series directly through inventorying of the data entries in their respective partitions. Moreover, the data may be partitioned so that all unstructured data set entries germane to the assembly of any given leaf-level time series are within the partition assigned to the device at which the given time series is assembled. In this way, once partitions of the unstructured data set are assigned to grid-computing devices 100G, the devices can individually assemble leaf-level time series without necessitating communication with other grid-computing devices.

The dataset shown below in Table 1 is the same as data set 302, which was shown earlier in FIG. 4, and explained in the discussion of that drawing. The dataset will be assumed to represent hypothetical furniture sales in the manner suggested above, and will be discussed for the purpose of illustrating one method for partitioning a data set in the grid-computing system, prior to the grid-computing devices assembling time series data hierarchies.

The grid-computing system described herein can partition a multi-dimensional data set using a technique that will be described as group-by partitioning. Group-by partitioning involves performing preliminary sorting to identify group-by subsets of the data set. A group-by subset can refer to, for example, a group of multi-dimensional entries in which the entries hold the same data with respect to a first variable dimension, as well as the same data with respect to a second variable dimension. For example, Table 2 and Table 3 shows two group-by subsets of the data set shown in Table 1.

TABLE 1

| PURCHASE NUMBER | COLOR | ITEM | MONTH |
|---|---|---|---|
| 48234 | BLUE | TABLE | MAY |
| 55663 | BLUE | CHAIR | JULY |
| 234353 | BLUE | CHAIR | JUNE |
| 56456 | RED | CHAIR | AUGUST |

TABLE 1-continued

| PURCHASE NUMBER | COLOR | ITEM | MONTH |
|---|---|---|---|
| 5645 | RED | TABLE | JULY |
| 55767 | BLUE | TABLE | JUNE |
| 765665 | RED | TABLE | AUGUST |
| 76765 | RED | TABLE | MAY |
| 8789 | BLUE | CHAIR | JUNE |
| 7687 | BLUE | CHAIR | MAY |
| 45435 | RED | CHAIR | MAY |
| 7878 | BLUE | CHAIR | AUGUST |
| 56547 | BLUE | CHAIR | JULY |
| 45465 | RED | TABLE | JUNE |
| 67656 | BLUE | CHAIR | AUGUST |
| 344 | RED | TABLE | JULY |
| 676 | BLUE | TABLE | JULY |
| 565766 | RED | CHAIR | JUNE |
| 7868754 | BLUE | CHAIR | MAY |
| 3435443 | BLUE | TABLE | JULY |
| 2333 | RED | TABLE | MAY |
| 56576 | BLUE | TABLE | AUGUST |
| 7778 | RED | TABLE | JUNE |
| 2435 | BLUE | TABLE | AUGUST |
| 787989 | RED | CHAIR | MAY |
| 23432432 | BLUE | CHAIR | AUGUST |
| 3454 | RED | CHAIR | JUNE |
| 23433 | RED | TABLE | AUGUST |
| 5767 | BLUE | TABLE | JUNE |
| 765676 | RED | TABLE | JUNE |
| 787 | BLUE | CHAIR | AUGUST |
| 34543 | BLUE | CHAIR | AUGUST |
| 23423 | RED | TABLE | JULY |
| 4354356 | BLUE | CHAIR | JULY |
| 68787 | RED | TABLE | AUGUST |
| 3454 | BLUE | TABLE | JUNE |
| 4354 | RED | TABLE | MAY |

TABLE 2

| 5645 | RED | TABLE | JULY |
|---|---|---|---|
| 765665 | RED | TABLE | AUGUST |
| 76765 | RED | TABLE | MAY |
| 45465 | RED | TABLE | JUNE |
| 344 | RED | TABLE | JULY |
| 2333 | RED | TABLE | MAY |
| 7778 | RED | TABLE | JUNE |
| 23433 | RED | TABLE | AUGUST |
| 765676 | RED | TABLE | JUNE |
| 23423 | RED | TABLE | JULY |
| 68787 | RED | TABLE | AUGUST |
| 4354 | RED | TABLE | MAY |

TABLE 3

| 55663 | BLUE | CHAIR | JULY |
|---|---|---|---|
| 234353 | BLUE | CHAIR | JUNE |
| 23432432 | BLUE | CHAIR | AUGUST |
| 7868754 | BLUE | CHAIR | MAY |
| 787 | BLUE | CHAIR | AUGUST |
| 34543 | BLUE | CHAIR | AUGUST |
| 4354356 | BLUE | CHAIR | JULY |
| 8789 | BLUE | CHAIR | JUNE |
| 7687 | BLUE | CHAIR | MAY |
| 7878 | BLUE | CHAIR | AUGUST |
| 56547 | BLUE | CHAIR | JULY |
| 67656 | BLUE | CHAIR | AUGUST |

The group-by subset in Table 2 is a two-dimensional group-by subset that is "formed on" the "color" and "piece" variables (the two variables with respect to which data is the same in all rows). Any variable on which a group-by subset is formed is referred to as a "group-by variable." Thus, in the case of the group-by subsets shown in Table 2, as well as in the case of the group-by subset shown in Table 3, the "color"

and "piece" variables are both group-by variables. Accordingly, the group-by subsets shown in Table 2 and Table 3 are referred to as two-dimensional group-by subsets of the data set shown in Table 1.

Moreover, every entry of the data set of Table 1 is associated with one of four distinct two-dimensional group-by subsets (red/table, red/chair, blue/table, blue/chair) formed on the "color" and "piece" variables. Stated another way, the union of these four group-by subsets is the entire data set of Table 1. When the union of multiple group-by subsets is the entire data set, this disclosure will refer to such group-by subsets as constituent group-by subsets.

Additionally or alternatively, a group-by subset, as used in the system disclosed herein, can be formed on a single variable, or more than two variables (when there are a sufficient number of dimensions in the entries of the data set).

Group-by partitioning involves using a partitioning schema that specifies one or more variable associated with the data set to be partitioned. Partitions of the data set are then defined such that no group-by subset formed on the specified variable(s) is divided by the partitioning. Stated another way, each entry of the data set is assigned to a partition based on its association with one of the group-by subsets formed on the specified variable(s), and in such a manner that no two entries associated with a same group-by subset are assigned to different partitions. The partitions may be defined in any way that satisfies this condition. In the situation just described, the data set will be described as being "partitioned on" the specified variable(s).

FIG. 7 provides a simplified illustration of an example of partitioning a data set on a single variable to form two separate partitions. In FIG. 7, the data set prior to partitioning is shown at 302. The data set 302, which was shown earlier in Table 1, includes multiple entries, each of which represents a sale of a furniture item. Each sale represented by an entry is associated with one of four furniture categories represented within the data set: blue chairs, blue tables, red chairs, and red tables.

Two partitions 402, 404 of the data set 302 are shown as being defined through partitioning of the data set 302 on the color variable. Because partitioning is performed on the color variable, all entries that represent blue furniture sells are grouped together, and all entries that represent red furniture sales are grouped together.

One key point intended to be emphasized by FIG. 7 is that when a data set is partitioned on a single variable, all data entries that are identical with regard to that variable are grouped together as part of a same partition. This is not to say that in a more complex example involving additional categories of furniture, a data entry representing the sale of furniture of one color would not be grouped with an entry representing the sale of furniture of another color. Rather, no two data entries may be in separate partitions if the entries are identical with regard to the variable on which the data set is partitioned.

FIG. 8 provides a simplified illustration of an example of partitioning a data set on a combination of two variables to form two separate partitions. In FIG. 8, the data set prior to partitioning is shown at 302.

Two partitions 502, 504 of the data set 302 are shown as being defined through partitioning of the data set 302 on the color and item variable. Because partitioning is performed on the "color" and the "item" variable, the entries that are identical with respect to both the color and item variable are grouped together. That is, all data entries from data set 302 that represent a sale of a red chair are found in partition 502, as are all of the data entries representing a sale of a blue table. Similarly, all data entries from data set 302 that represent a sale of a red table are grouped together in partition 504, along with all of the data entries that represent a sale of a blue chair.

One key point intended to be emphasized by FIG. 8 is that when a data set is partitioned on two or more variables, all data entries that are identical with regard to each of those variables are grouped together as part of a same partition. This is not to say that data entries that are not identical with regards to those variables will not be grouped together. Rather, no two data entries may be in separate partitions if the entries are identical with regard to all variables on which the data set is partitioned. This grouping methodology may be used by the grid computing system to partition a data set prior to grid-computing devices 100G assembling time series data hierarchies that represent the data set.

Figure 9:
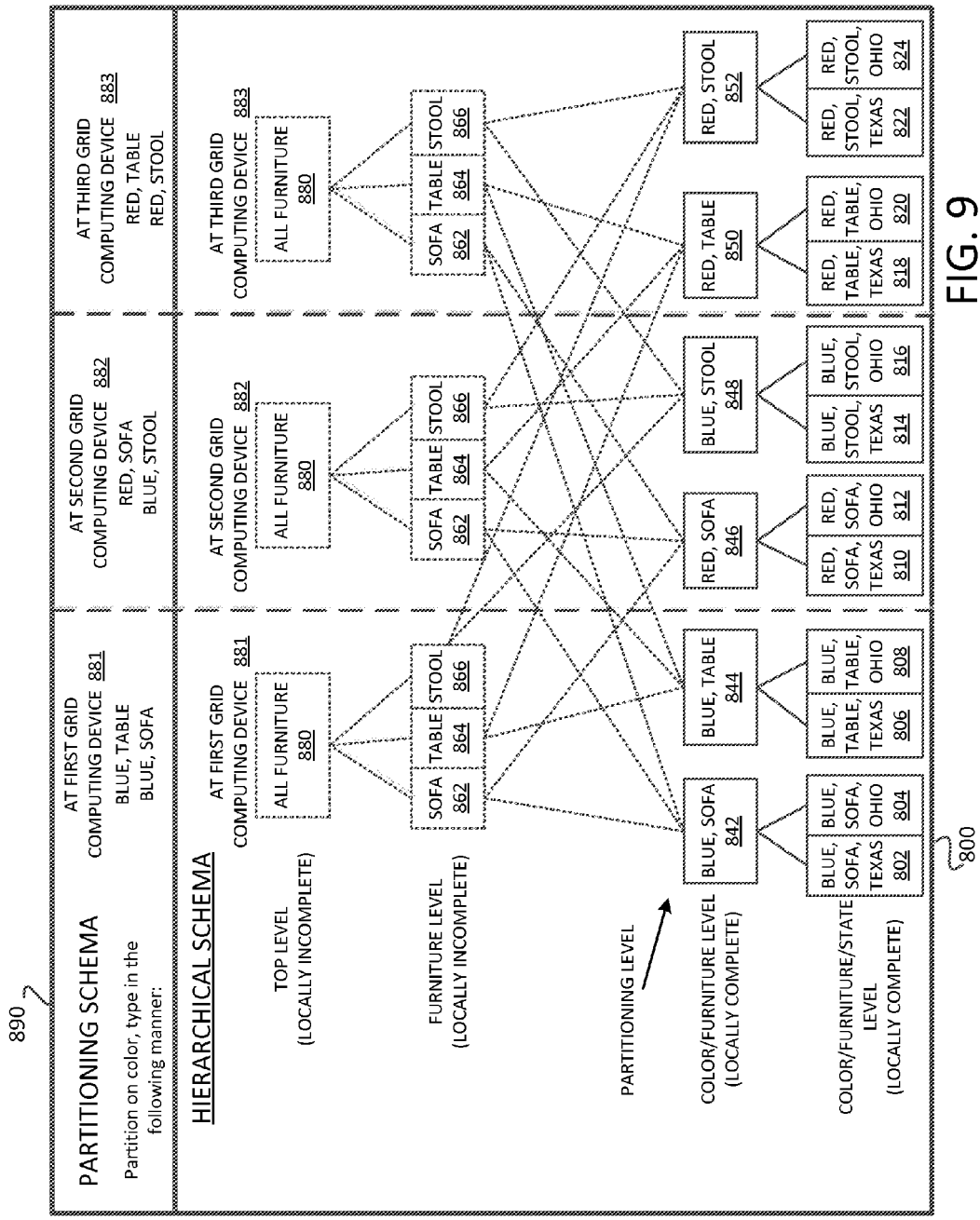

FIG. 9 is an example of a partitioning schema 890 and a hierarchical schema 800 that is suitable to be used together with the partitioning schema 890 in a grid-computing system. The partitioning schema 890 provides instructions for using group-by partitioning to partition a data set that includes at least a furniture item dimension associated with values "table", "sofa" and "chair", and a color dimension associated with values "red" and "blue".

The partitioning schema 890 prescribes group-by data set partitioning on the furniture item variable and the color variable such that:

1) all entries associated with blue tables and all entries associated with blue sofas are in a partition that is assigned to the first grid-computing device 881;
2) all entries associated with red sofas and blue stools are in a partition that is assigned to the second grid-computing device 882; and
3) all entries all entries associated with red tables and red stools are in a partition that is assigned to the third grid-computing device 883.

The hierarchical schema 800 specifies the formation of a time series data hierarchy for storing time series that represent data entries in a data set having at least three dimensions—a furniture item dimension associated with values "table", "sofa" and "chair", a color dimension associated with values "red" and "blue", and a location dimension associated with values "Ohio" and "Texas". The hierarchical schema 800 is arranged in view of the partitioning instructions provided by partitioning schema 890, and, like partitioning schema 890, provides instructions specific to the first, second and third grid-computing device 881, 882, 883.

Within the time series hierarchy specified by the hierarchical schema 800, lines that connect lower level time series to a time series at a higher level represent instructions for the aggregation of time series data. Thus, for example, the hierarchical schema 800 specifies that the second grid-computing device 882 assemble time series 848 to represent data regarding blue stools by aggregating the data in time series 814 and 816.

Additionally, the second hierarchical level (color/furniture) specified by the hierarchical schema 800 is the partitioning level. The partitioning level is the highest level at which each prescribed time series can be assembled locally by the first, second or third grid-computing device 881, 882, 883, as a result of the partitioning instructions provided by the partitioning schema 890. Thus, at the partitioning level and below, all specified time series are "locally complete". For example, the partitioning schema 890 specifies data set partitioning such that all entries related to blue sofas are assigned to the first grid-computing device 881. Thus, in hierarchical schema 800, the time series for data regarding blue sofas 842 can be assembled by the first grid-computing device 881 through aggregation of the data in time series 802 and 804, without obtaining information from other grid-computing devices 882, 883.

Similarly, at the leaf-level (color/furniture item/state) of the hierarchical schema 800, the time series for data regarding blue tables in Texas can be assembled by the first grid-computing device 881 without obtaining information from the other devices. This fact results from partitioning schema 890 specifying data set partitioning such that all entries related to blue tables are assigned to the first grid-computing device 881.

Above the partitioning level, all specified time series are locally incomplete. Thus, the hierarchical schema 800 specifies that in assembling the time series 862, 864, 866 associated with the third level of the hierarchical schema 800, the first, second and third grid-computing devices 881, 882, 883 exchange information, as indicated by the dashed lines linking time series at the second level with time series at the third level. The exchange of information will result in each grid-computing device 881, 882, 883 having all information to assemble a local copy of time series 862, 864 and 866, which relate to all sofa entries, all table entries and all chair entries, respectively. This type of information sharing between multiple grid-computing devices will be referred to as horizontal sharing.

The hierarchical schema 800 also specifies that, upon the time series of the third level 862, 864, 866 being assembled, each grid-computing device assemble a local copy of the time series 880 by aggregating the information in time series 862, 864 and 866. In this way, a copy of each time series 862, 864, 866, 880 associated with a locally incomplete level will be stored by each of the three grid-computing devices 881, 882, 883 upon the entire time series hierarchy being assembled.

Figure 10:
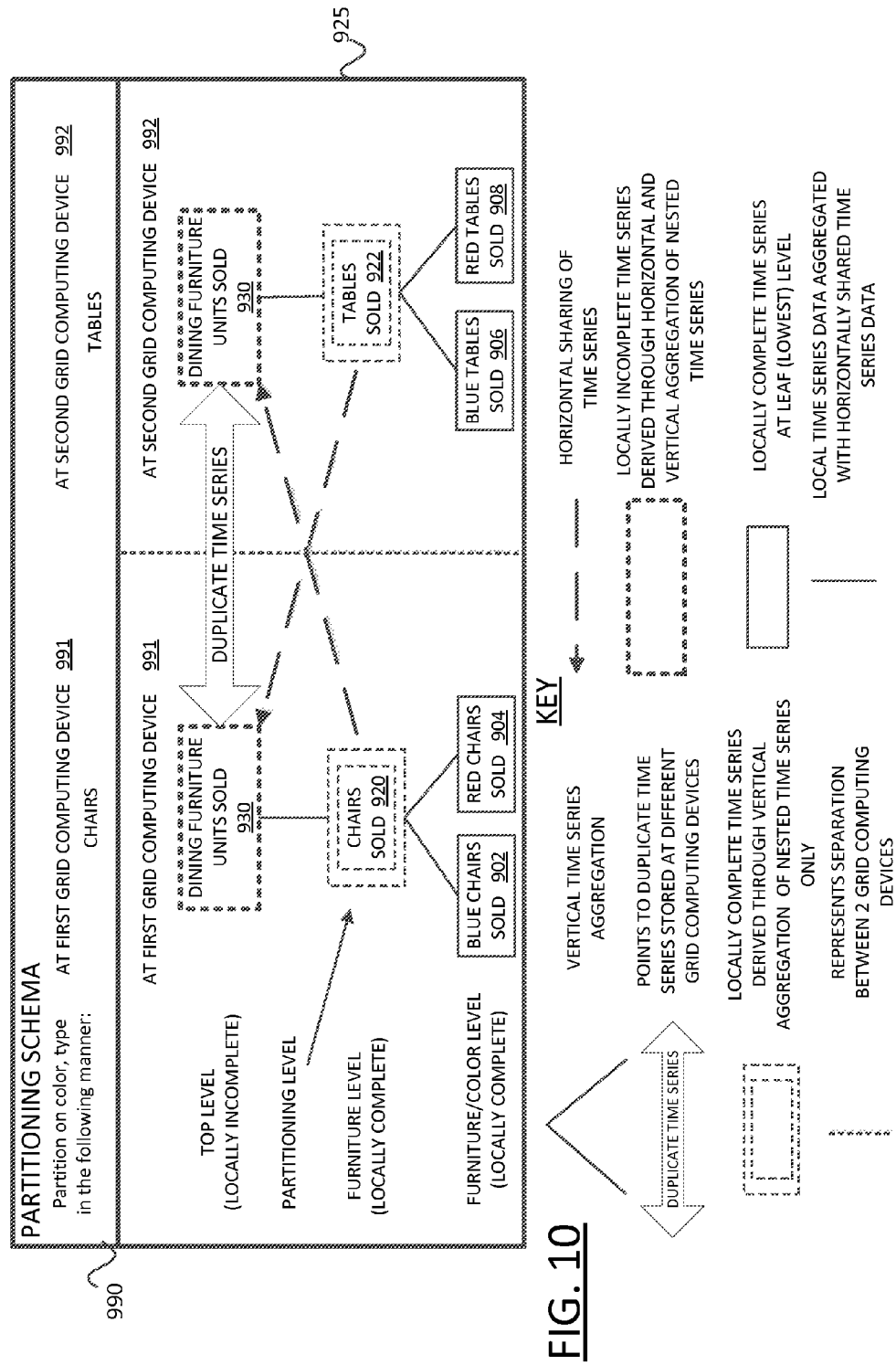

FIG. 10 depicts an example of a partitioning schema 990. The partitioning schema provides instructions for partitioning a data set that includes data regarding chairs and tables. The partitioning schema 990 prescribes partitioning such a data set into two partitions such that a first grid-computing device is assigned all data associated with chairs and a second grid-computing device is assigned all data associated with tables.

FIG. 10 also depicts an example of a hierarchical schema 925 that is suitable to be used, in conjunction with partitioning schema 990, by a grid-computing system that includes two grid-computing devices 991, 992. The hierarchical schema 925 prescribes a time series hierarchy that includes a leaf-level, a second level, and an upper level. The second level is the partitioning level, and both the second level and leaf-levels are therefore locally complete.

Hierarchical schema 925 prescribes that, following partition of a data set as detailed by partitioning schema 990, the first grid-computing device 991 assemble time series 902 and 904, and the second grid-computing device 992 assemble time series 906 and 908. The hierarchical schema 925 prescribes that the first grid-computing device 991 assemble time series 920 by aggregating time series 902 and 904, and the second grid-computing device 992 assemble time series 922 by aggregating time series 906 and 908.

Also, the hierarchical schema 925 prescribes that the first-grid computing device 991 communicate time series 920 to the second grid-computing device 992, and that the second grid-computing device 992 assemble time series 930 by aggregating time series 920 and time series 922. Additionally, the hierarchical schema prescribes that the second grid-computing device 992 communicate time series 922 to the first grid-computing device 991, and that the first grid-computing 991 device assemble time series 930 by aggregating time series 922 and time series 920.

Figure 11:
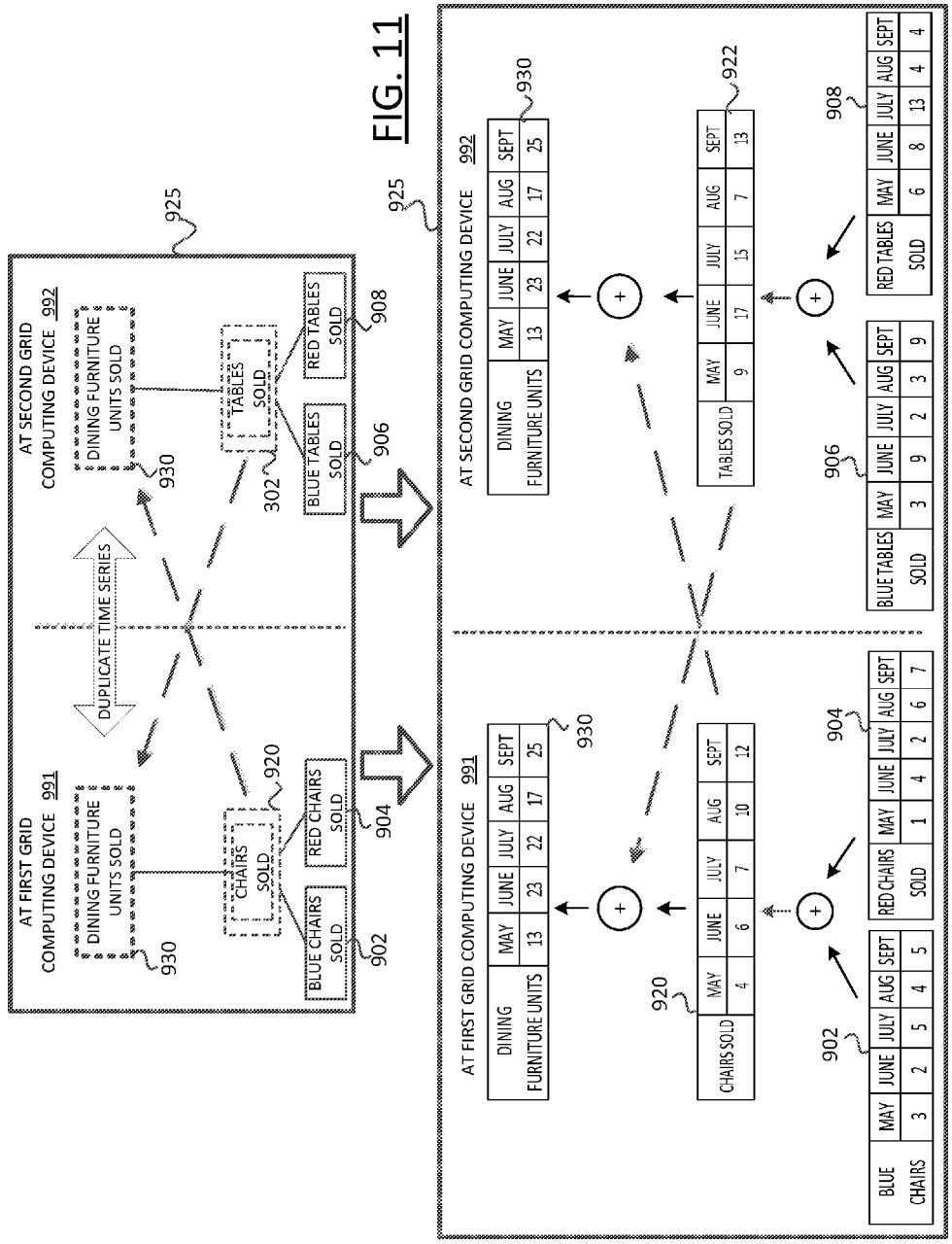

FIG. 11 is an example of a flow chart that provides a general illustration of certain operations during the course of one example process for assembling a time series data hierarchy 925 as prescribed by a hierarchical schema 925. The process depicted in FIG. 11 involves the first grid-computing device 991 and the second grid-computing device 992 referred to in the discussion of FIG. 10. Also, in FIG. 11, hierarchical schema 925 is shown again for reference. Furthermore, it should be understood that only a portion of the process is actually depicted in FIG. 11. For example, in FIG. 11, only operates subsequent to the assembly of time series 902, 904, 906 and 908 are shown. Although not depicted in FIG. 11, the first and second grid-computing devices 991, 992 may use techniques such as those shown in FIGS. 4 and 5 to assemble time series 902, 904, 906 and 908.

FIG. 11 shows that the first grid-computing device 991 may assemble time series 920 by performing month-by-month addition of the values in time series 902 and 904. After time series 920 is assembled, the first grid-computing device 991 shares time series 920 with the second grid-computing device 992.

FIG. 11 also shows that the second grid-computing device may assemble time series 922 by performing month-by-month addition of the values in time series 906 and 908. After time series 922 is assembled, the second grid-computing device 992 shares time series 920 with the second grid-computing device 992.

Both the first grid-computing device 991 and the second-grid computing device 992 assemble a local version of time series 930 by performing month-by month addition of the values in time series 920 and 922. At this point, the time series hierarchy specified by the hierarchical schema 925 is complete, and either of the two grid computing devices 991, 992 can be used to perform forecasting involving any of the time series forecasts that they assembled.

Figure 12:
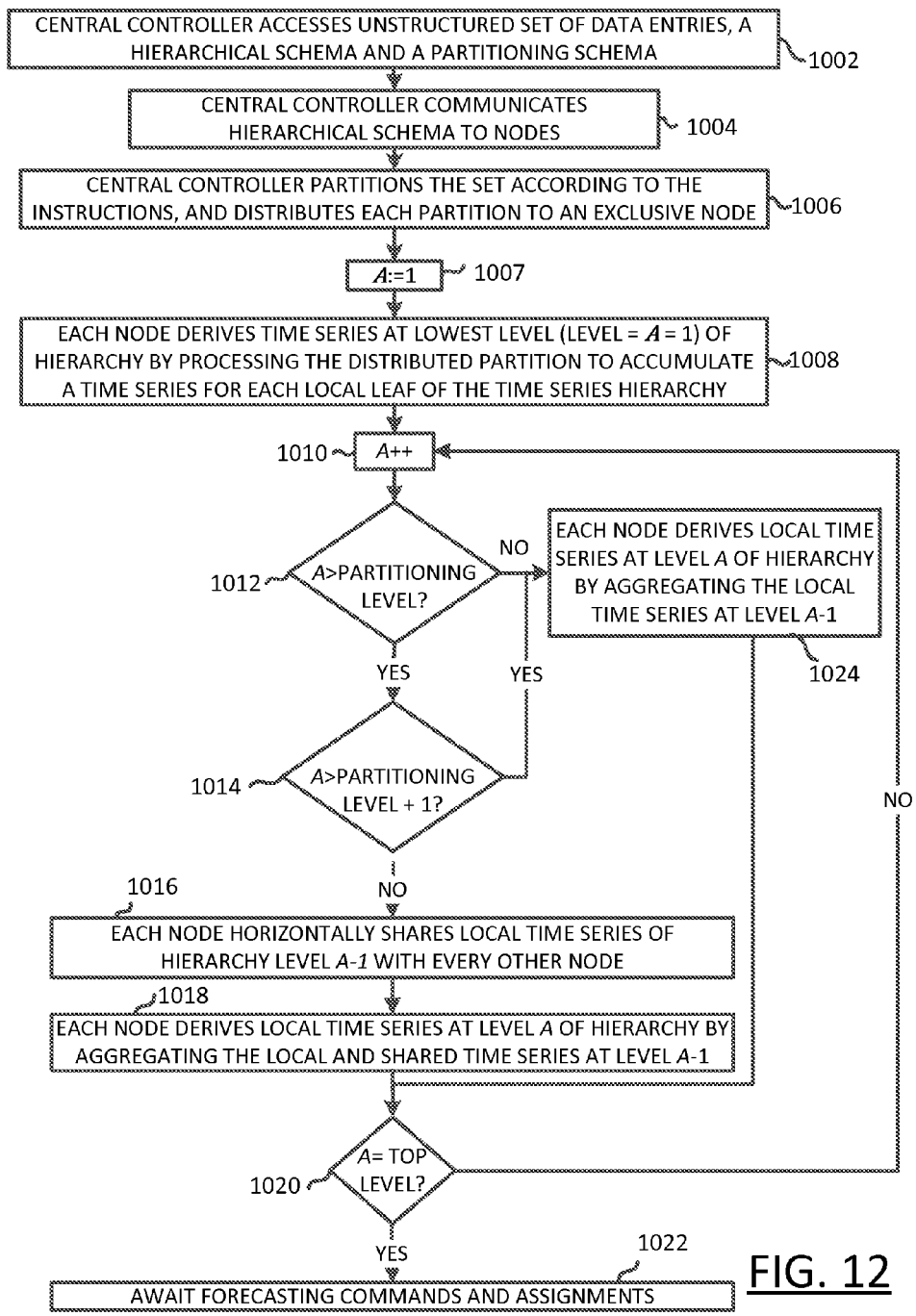

FIG. 12 is a flow diagram that provides an example of operations that may be used to assemble a time series hierarchy in a grid-computing system, and in accordance with a hierarchical schema. FIG. 12 depicts that at 1002, a central processing device accesses an unstructured set of data entries, a hierarchical schema and a partitioning schema. At 1004, the central controller communicates the hierarchical schema to the nodes of the grid-computing system. In FIG. 12 and this discussion of that drawing, the term "node" will be understood to refer to a grid-computing device.

At 1006, the central controller partitions the set according to the instructions, and distributes each partition to an exclusive node. At 1007, a counting variable A is set to 1. At 1008, each node derives time series at a lowest level (A=1) of the hierarchy by processing the distributed partition to accumulate a time series for each local leaf of the time series hierarchy. At 1010, the grid-computing system increments A.

At 1012, if A is not greater than a partitioning level, each node derives local time series at level A of the hierarchy by aggregating the local time series at level A−1. This derivation is depicted at 1024.

If A is greater than the partitioning level at 1012 and at least 2 greater than the partitioning level at 1014, then the nodes also perform the operation at 1024. Otherwise, at 1016, each node horizontally shares the local time series of hierarchy level A−1 with every other node. Then, at 1018, each node derives local time series at level A of the hierarchy by aggregating the local and shared time series at level A−1.

If, at 1020, A is not equal to the top level of the hierarchy, the process returns to 1010. Otherwise, if A is equal to the top level of the hierarchy, the time series hierarchy is complete at each node. Thus, at 1022 the nodes await forecasting commands and assignments so that forecasting may be performed on the time series of the hierarchy.

Figure 13:
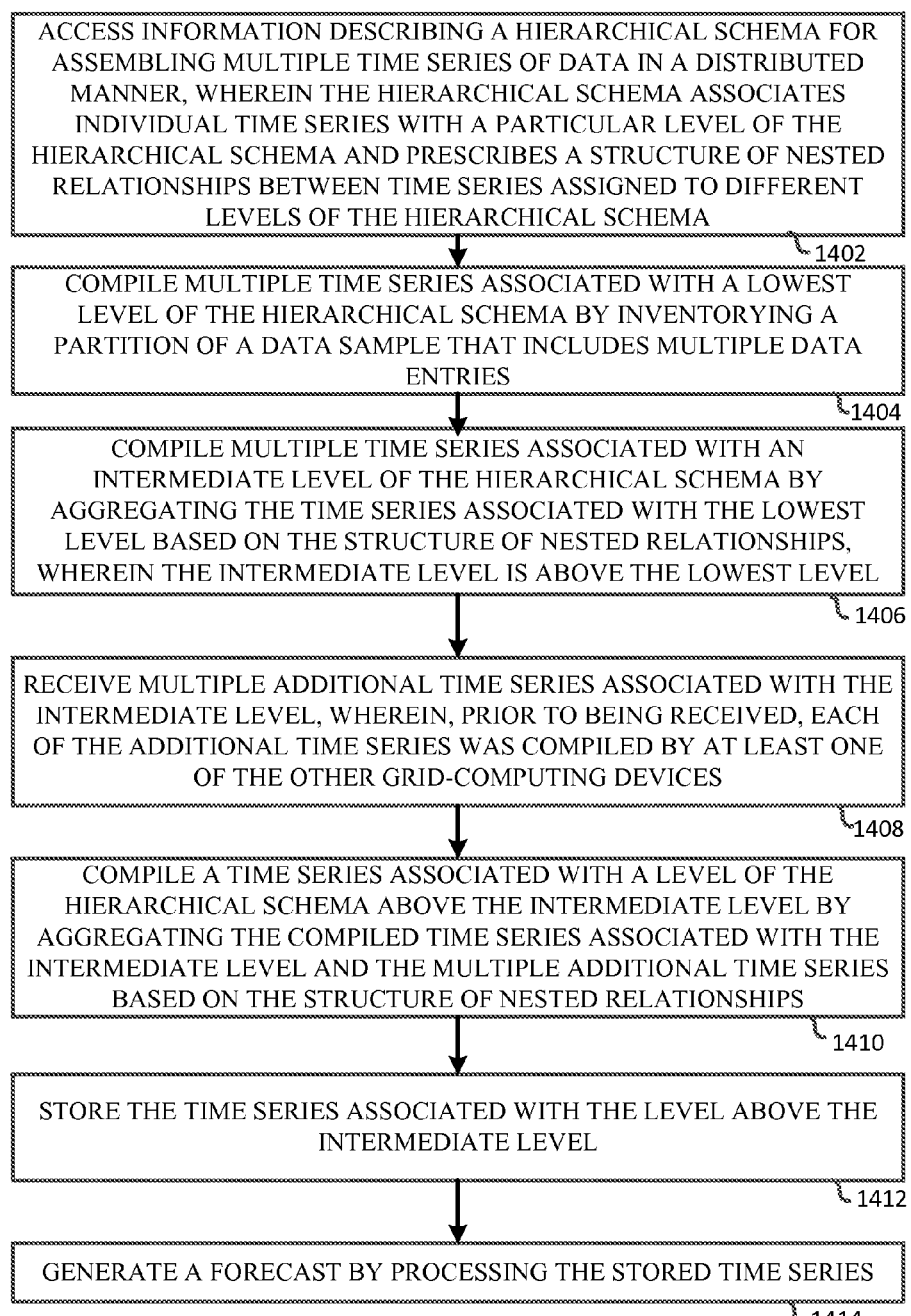

FIG. 13 depicts example operations for constructing a time series data hierarchy as described in this disclosure. At 1402, the flow chart depicts accessing a hierarchical schema for assembling multiple time series of data in a distributed manner, wherein the hierarchical schema associates individual time series with a particular level of the hierarchical schema and prescribes a structure of nested relationships between time series assigned to different levels of the hierarchical schema.

At 1404, the flow chart depicts assembling multiple time series associated with a lowest level of the hierarchical schema by inventorying a partition of a data sample that includes multiple data entries.

At 1406, the flow chart depicts assembling multiple time series associated with an intermediate level of the hierarchical schema by aggregating the time series associated with the lowest level based on the structure of nested relationships, wherein the intermediate level is above the lowest level.

At 1408, the flow chart depicts receiving multiple additional time series associated with the intermediate level, where, prior to being received, each of the additional time series was assembled by at least one of the other grid-computing devices.

At 1410, the flow chart depicts assemble a time series associated with a level of the hierarchical schema above the intermediate level by aggregating the assembled time series associated with the intermediate level and the multiple additional time series based on the structure of nested relationships.

At 1412, the flow chart depicts storing the time series associated with the level above the intermediate level. At 1414, the flow chart depicts generating a forecast by processing the stored time series. In some embodiments, the storage of time series and their respective values may occur at one or more points within the flow chart.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

Specific details are given in the description to provide a thorough understanding of examples of configurations (including implementations). However, configurations may be practiced without these specific details. For example, well-known circuits, processes, algorithms, structures, and techniques have been shown without unnecessary detail in order to avoid obscuring the configurations. This description provides examples of configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several examples of configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of operations may be undertaken before, during, or after the above elements are considered. Accordingly, the above description does not bound the scope of the claims.

The use of "capable of", "adapted to", or "configured to" herein is meant as open and inclusive language that does not foreclose devices adapted to or configured to perform additional tasks or operations. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may be of other types, designs and configurations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A computer-program product tangibly embodied in a non-transitory, machine-readable storage medium having instructions stored thereon, the instructions being executable to cause a grid-computing device to perform the following operations:
   accessing information while being operated in a grid-computing system that includes other grid-computing devices,
   wherein the information describes a hierarchical schema for assembling multiple time series of data in a distributed manner that includes assembling multiple time series at the grid-computing device and other time series at the other grid-computing devices,
   wherein the hierarchical schema associates each of the multiple time series with a particular level of the hierarchical schema and prescribes a structure of nested relationships between time series assigned to different levels of the hierarchical schema;
   assembling multiple time series associated with a lowest level of the hierarchical schema by inventorying a portion of a data set;
   assembling multiple time series associated with an intermediate level of the hierarchical schema by aggregating the time series associated with the lowest level based on the structure of nested relationships, wherein the intermediate level is above the lowest level, and wherein:
      the data set is partitioned at the intermediate level of the hierarchical schema such that a first number (n) of partitions are defined, the n partitions including:
      a partition that includes the inventoried portion;
      and a second number (n−1) of other partitions;
      the other grid-computing devices consist of n−1 grid-computing devices; and
      each of the other partitions is assigned to one of the other grid-computing devices;
   receiving multiple additional time series associated with the intermediate level and assembled by at least one of the other grid-computing devices;
   assembling a time series associated with a level of the hierarchical schema above the intermediate level by aggregating the assembled time series associated with the intermediate level and the multiple additional time series based on the structure of nested relationships;
   using volatile memory to store the time series associated with the level above the intermediate level;
   accessing the stored time series in memory; and
   generating a forecast by processing the accessed time series.

2. The computer-program product of claim 1, wherein:
   no two of the other partitions are assigned to a same one of the other grid-computing devices.

3. The computer-program product of claim 2, wherein the operations further include:
   providing each of the other grid-computing devices with each of the assembled time series associated with the intermediate level.

4. The computer-program product of claim 2, wherein:
   the data set includes observations with respect to multiple variables; and
   the data set is partitioned in accordance with a group-by data partitioning scheme in which at least one of the variables is specified as a group-by variable.

5. The computer-program product of claim 4, wherein the group-by data partitioning scheme prescribes:
   identifying group-by groups of data entries formed on one or more group-by variables; and
   partitioning the data set such that none of the group-by groups are segmented by the partitioning.

6. The computer-program product of claim 1, wherein one of the relationships relates a single time series associated with the intermediate level to multiple time series associated with the lowest level.

7. The computer-program product of claim 6, wherein the one of the relationships relates the single time series to the multiple time series through summation.

8. The computer-program product of claim 6, wherein the one of the relationships relates the single time series to the multiple nested time series through averaging.

9. A computer-implemented method comprising the following operations performed by a grid-computing device while operating in a grid-computing system that includes other grid-computing devices:
   accessing information describing a hierarchical schema for assembling multiple time series of data in a distributed manner that includes assembling multiple time series at the grid-computing device and other time series at the other grid-computing devices,
   wherein the hierarchical schema associates individual time series with a particular level of the hierarchical schema and prescribes a structure of nested relationships between time series assigned to different levels of the hierarchical schema;
   assembling multiple time series associated with a lowest level of the hierarchical schema by inventorying a portion of a data set;
   assembling multiple time series associated with an intermediate level of the hierarchical schema by aggregating the time series associated with the lowest level based on the structure of nested relationships, wherein the intermediate level is above the lowest level, and wherein:
      the data set is partitioned at the intermediate level of the hierarchical schema such that a first number (n) of partitions are defined, the n partitions including:
      a partition that includes the inventoried portion;
      and a second number (n−1) of other partitions;
      the other grid-computing devices consist of n−1 grid-computing devices; and
      each of the other partitions is assigned to one of the other grid-computing devices;

receiving multiple additional time series associated with the intermediate level and assembled by at least one of the other grid-computing devices;

assembling a time series associated with a level of the hierarchical schema above the intermediate level by aggregating the assembled time series associated with the intermediate level and the multiple additional time series based on the structure of nested relationships;

using volatile memory to store the time series associated with the level above the intermediate level; and accessing the stored time series in memory; and generating a forecast by processing the accessed time series.

10. The method of claim 9, wherein:

no two of the other partitions are assigned to a same one of the other grid-computing devices.

11. The method of claim 10, further comprising:

providing each of the other grid-computing devices with each of the assembled time series associated with the intermediate level.

12. The method of claim 10, wherein each of the other grid-computing devices:

assembles at least one additional time series associated with the lowest level by inventorying the respectively assigned partition;

assembles at least one time series associated with the intermediate level by aggregating time series associated with the lowest level, based on the structure of relationships;

provides the grid-computing device and at least one of the other grid-computing devices with at least one time series associated with the intermediate level; and receives at least one time series associated with the intermediate level from at least one of the other grid-computing devices.

13. The method of claim 10, wherein:

the data set includes observations with respect to multiple variables; and the data set is partitioned in accordance with a group-by data partitioning scheme in which at least one of the variables is specified as a group-by variable.

14. The method of claim 13, wherein the group-by data partitioning scheme prescribes:

identifying group-by groups of data entries formed on one or more group-by variables; and partitioning the data set such that none of the group-by groups are segmented by the partitioning.

15. The method of claim 9, wherein one of the relationships relates a single time series associated with the intermediate level to multiple time series associated with the lowest level.

16. The method of claim 15, wherein the one of the relationships relates the single time series to the multiple nested time series through summation.

17. The method of claim 15, wherein the one of the relationships relates the single time series to the multiple nested time series through averaging.

18. A grid-computing device comprising:

a hardware processor configured to perform operations while the grid-computing device operates in a grid-computing system that includes other grid-computing devices, the operations including:

accessing information describing a hierarchical schema for assembling multiple time series of data in a distributed manner that includes assembling multiple time series at the grid-computing device and other time series at the other grid-computing devices, wherein the hierarchical schema associates individual time series with a particular level of the hierarchical schema and prescribes a structure of nested relationships between time series assigned to different levels of the hierarchical schema;

assembling multiple time series associated with a lowest level of the hierarchical schema by inventorying a portion of a data set;

assembling multiple time series associated with an intermediate level of the hierarchical schema by aggregating the time series associated with the lowest level based on the structure of nested relationships, wherein the intermediate level is above the lowest level, and wherein:

the data set is partitioned at the intermediate level of the hierarchical schema such that a first number (n) of partitions are defined, the n partitions including:

a partition that includes the inventoried portion:

and a second number (n−1) of other partitions;

the other grid-computing devices consist of n−1 grid-computing devices; and each of the other partitions is assigned to one of the other grid-computing devices;

receiving multiple additional time series associated with the intermediate level and assembled by at least one of the other grid-computing devices;

assembling a time series associated with a level of the hierarchical schema above the intermediate level by aggregating the assembled time series associated with the intermediate level and the multiple additional time series based on the structure of nested relationships;

using volatile memory to store the time series associated with the level above the intermediate level;

accessing the stored time series in memory; and generating a forecast by processing the accessed time series.

19. The grid-computing device of claim 18, wherein:

no two of the other partitions are assigned to a same one of the other grid-computing devices.

20. The grid-computing device of claim 19, wherein the operations further include:

providing each of the other grid-computing devices with each of the assembled time series associated with the intermediate level.

21. The grid-computing device of claim 19, wherein:

the data set includes observations with respect to multiple variables; and the data set is partitioned in accordance with a group-by data partitioning scheme in which at least one of the variables is specified as a group-by variable.

22. The grid-computing device of claim 21, wherein the group-by data partitioning scheme prescribes:

identifying group-by groups of data entries formed on one or more group-by variables; and partitioning the data set such that none of the group-by groups are segmented by the partitioning.

23. The grid-computing device of claim 18, wherein a particular one of the relationships relates a single time series associated with the intermediate level to multiple time series associated with the lowest level.

24. The grid-computing device of claim 23, wherein the particular relationship relates the single time series to the multiple time series through summation.

25. The grid-computing device of claim 23, wherein the particular nested relationship relates the single time series to the multiple nested time series through averaging.

26. The grid-computing device of claim 18, wherein accessing information describing a hierarchical schema includes receiving the information from a central control processing device configured to synchronize the grid-computing system.

27. The grid-computing device of claim 26, wherein generating a forecast includes:
   receiving a command to generate the forecast from the central control processing device; and
   communicating the forecast to the central control processing device.

* * * * *